United States Patent
Güntherberg et al.

[11] Patent Number: 6,165,399
[45] Date of Patent: Dec. 26, 2000

[54] PROCESS FOR PRODUCING THERMOPLASTICS

[75] Inventors: Norbert Güntherberg, Speyer; Jürgen Hofmann, Ludwigshafen; Elmar Mailahn, Worms; Hilmar Ohlig, Kaiserslautern; Bernhard Czauderna, Hirschberg; Sven Grabowski, Ludwigshafen; Klaus Bus, Kaiserslautern, all of Germany

[73] Assignee: BASF Aktiengesellschaft, Luwigshafen, Germany

[21] Appl. No.: 09/269,344

[22] PCT Filed: Sep. 12, 1997

[86] PCT No.: PCT/EP97/05000

§ 371 Date: Mar. 25, 1999

§ 102(e) Date: Mar. 25, 1999

[87] PCT Pub. No.: WO98/13412

PCT Pub. Date: Apr. 2, 1998

[30] Foreign Application Priority Data

Sep. 26, 1996 [DE] Germany ............................ 196 39 465

[51] Int. Cl.$^7$ ............................ B29C 47/40; B29C 47/64; B29C 47/76
[52] U.S. Cl. .................... 264/102; 264/143; 264/211.23; 366/75; 366/76.6; 366/77; 366/85; 366/88; 425/198; 425/203; 425/204; 425/208
[58] Field of Search ..................................... 264/102, 143, 264/211.23; 425/198, 203, 204, 208; 366/75, 76.6, 77, 85, 88

[56] References Cited

U.S. PATENT DOCUMENTS

| | | |
|---|---|---|
| 4,110,843 | 8/1978 | Skidmore . |
| 4,802,769 | 2/1989 | Tanaka . |
| 5,151,026 | 9/1992 | Andersen . |
| 5,232,649 | 8/1993 | Andersen . |
| 5,650,107 | 7/1997 | Vetter et al. . |
| 5,851,463 | 12/1998 | Guntherberg et al. .............. 264/102 X |

FOREIGN PATENT DOCUMENTS

| | | |
|---|---|---|
| 233 371 | 8/1987 | European Pat. Off. . |
| 534 235 | 3/1993 | European Pat. Off. . |
| 665 095 | 8/1995 | European Pat. Off. . |
| 683 028 | 11/1995 | European Pat. Off. . |
| 1 579 106 | 1/1970 | Germany . |
| 2 037 784 | 3/1972 | Germany . |
| 44 46 129 | 6/1995 | Germany . |
| 94 21 779 | 1/1997 | Germany . |

OTHER PUBLICATIONS

Abstract of Japan 59–210967 (Nov. 29, 1984).
Abst. of Japan 57–167303 (Oct 15, 1982).
Abst. of Japan 4–8754 (Jan. 13, 1992).
Abst. of Japan 1–202406 (Aug. 15, 1989).
Abst of Japan 1–123853 (May 16, 1989).
Abst of Japan 2–286208 (Nov. 26, 1990).
Abstract of Japan 4–311704 (Nov. 4, 1992).

*Primary Examiner*—Leo B. Tentoni
*Attorney, Agent, or Firm*—Keil & Weinkauf

[57] ABSTRACT

A process for preparing thermoplastics or polymer blends comprising (A) from 5 to 95% of a water-moist elastomer component containing up to 60% of residual water, (B) from 5 to 95% of a thermoplastic polymer, (C) from 0 to 95% of a further polymer, and (D) from 0 to 70% of additives, said process comprising mixing the components A to D in an extruder with mechanical dewatering of component A, wherein the extruder has at least two rotating screws and, in the conveying direction, is essentially composed of a metering section into which component A is fed, a squeeze section which serves for dewatering component A and contains a retarding element and an associated dewatering orifice which is present upstream of the retarding element by a distance corresponding to at least one screw diameter, a feed section in which the thermoplastic polymer B is introduced as a melt into the extruder, a plastication section with mixing or kneading elements, a devolatilization section with an orifice and in which the remaining water is removed as steam, and a discharge zone.

28 Claims, 1 Drawing Sheet

PROCESS FOR PRODUCING THERMOPLASTICS

BRIEF SUMMARY OF THE INVENTION

The present invention relates to a novel process for the preparation of toughened thermoplastics or polymer blends containing toughened thermoplastics, the thermoplastics or the polymer blends comprising A) from 5 to 95% by weight of at least one water-moist elastomer component A containing up to 60% by weight of residual water, B) from 5 to 95% by weight of at least one thermoplastic polymer B, C) from 0 to 95% by weight of at least one further polymer C, and d) from 0 to 70% by weight of additives D, by mixing the elastomer component A with the thermoplastic polymer B and, if present, the further polymer C and, if present, the additives D in an extruder with mechanical dewatering of the elastomer component A.

The present invention furthermore relates to molding materials prepared by the process and the use of the molding materials for the production of films, fibers and moldings. Finally, the present invention relates to an extruder for the preparation of the thermoplastics.

BACKGROUND OF THE INVENTION

Particulate rubbers which may be grafted or ungrafted are frequently used as elastomer components for toughening thermoplastics or other plastics. Such rubbers are usually prepared in aqueous systems, for example by emulsion or suspension polymerization. The particles formed in the suspension polymerization or precipitated in the emulsion polymerization (for example by adding a coagulating precipitating agent) are as a rule washed with water and dewatered by a suitable dewatering method, such as sieving, pressing out, filtration, decanting, settling out, centrifuging or partial thermal drying, for example by means of a pneumatic dryer. Partial dewatering by spray drying is also possible. Partially dewatered products are obtained in every case.

DETAILED DESCRIPTION OF THE INVENTION

Figure 1:
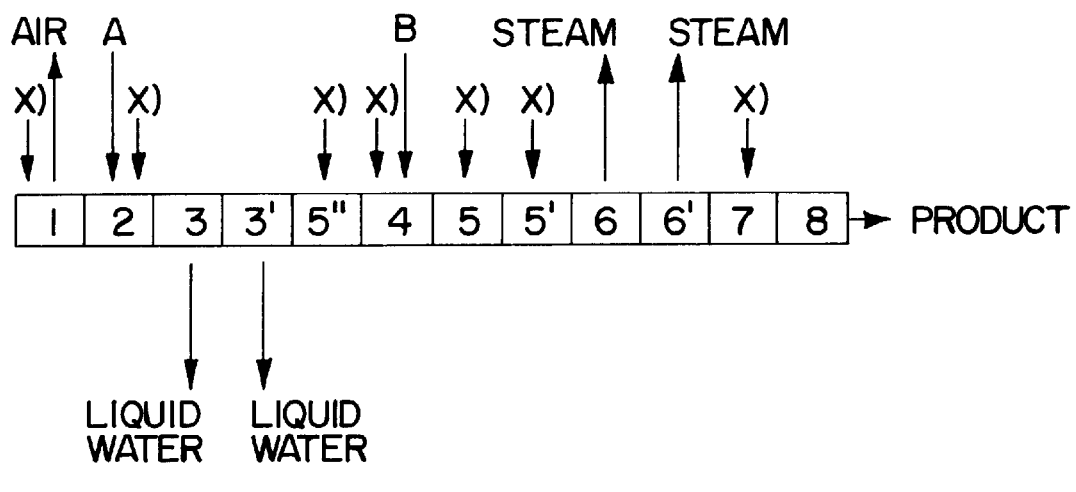

Frequently used graft rubbers are, for example, polybutadiene grafted with a styrene/acrylonitrile copolymer (SAN) and poly-n-butyl acrylate grafted with such a copolymer, or rubbers composed of a plurality of graft stages and based on butadiene, styrene, n-butyl acrylate, ethylhexyl acrylate, methyl methacrylate and/or acrylonitrile.

The residual water content of the rubber obtained after partial dewatering is up to 60% by weight and is usually removed by energy-intensive drying. The dried rubber obtained as a powder is finally incorporated into the thermoplastics present as powder or granules with melting, the end product being formed. Processes in which rubber polymers and matrix polymers are precipitated and dried together are also known. Owing to the content of fine dust, the rubber powder tends to undergo spontaneous ignition during the drying and the incorporation into the thermoplastics.

According to a proposal described in DE-A-20 37 784, partially dewatered graft rubber can be mixed into an SAN melt under superatmospheric pressure and a thermoplastic containing this graft rubber can be obtained with evaporation of the water. This process requires a relatively large amount of electrical energy.

EP-A 534 235 describes a process for the preparation of toughened thermoplastics by incorporating rubber subjected to partial mechanical dewatering into a thermoplastic above the softening point of the thermoplastic, the incorporation being effected in a main extruder and the partial dewatering of the rubber being carried out in a side extruder mounted at the side of the main extruder. The residual water remaining in the rubber is removed as steam during the incorporation, through devolatilization orifices present before and after the feed point. The disadvantage of this process is the necessity of operating two extruders for the preparation of the impact-resistant thermoplastic.

The German utility model DE-U 94 21 779 discloses an extruder for compounding moist material in which washed plastic wastes are pushed into the extruder using a stuffing device (stuffing screw). The water adhering to the chopped plastic pieces is removed through an opening in the extruder, the opening being provided with a screw to retain the plastic.

U.S. Pat. No. 5,151,026 describes an extruder in which comminuted and washed plastics wastes whose water content is up to 50% by weight are dewatered. For this purpose, short sections having a left-handed thread are present in the extruder screw, which otherwise has a right-handed thread in the usual manner. A devolatilization orifice is present in the region of the left-handed thread sections or immediately before the left-handed threads. The extruder content is under high pressure (pressure maximum) in this region owing to the retarding effect of the left-handed threads, and the devolatilization orifice must therefore be closed by means of an extruder which prevents the polymer from emerging. This technically complicated seal is disadvantageous. The divisional application U.S. Pat. No. 5,232,649 based on this U.S. patent describes the corresponding process.

EP-A 233 371 discloses a process for the preparation of a thermoplastic resin, in which the latex of a graft rubber, a water-soluble precipitating agent and an organic solvent are mixed to give a two-phase mixture and the aqueous phase is separated off. The organic phase is devolatilized in an extruder, mixed with the metered melt of a styrene/acrylonitrile copolymer and devolatilized again and the product is discharged. The disadvantages of these expensive processes is that large amounts of water initially have to be used and then removed again, that expensive and rapidly evaporating organic solvents must be handled and that graft rubber particles are increasingly entrained by the outflowing gas during devolatilization before the addition of the SAN melt.

JP 01 123 853 discloses a process in which the latex of a graft rubber, a water-soluble precipitating agent and an organic chemical are mixed in a kneader, the latex being coagulated. The coagulated latex is separated off in the kneader and is further dewatered and devolatilized in an extruder. The process has the disadvantages that large amounts of liquid have to be handled, with the result that the throughput (amount of product per unit time) is low, that the latex coagulation is part of the process and takes place in a technically complex kneader (instead of, for example, in a simple stirred container), and that the solution of the precipitating agent may cause corrosion in the kneader.

JP 22 86 208 describes a twin-screw extruder for dewatering thermoplastic molding materials, whose screws having a right-handed thread each possess two left-handed thread sections. The water passes in liquid form through Seiher housings—sieve-like inserts in the extruder barrel— and emerges as steam through devolatilization orifices. However, the Seiher housings tend to become blocked by emerging polymer material, as described, for example, in DE 15 79 106 for the dewatering of synthetic rubber. The preparation of the molding materials is thus susceptible to problems. The extruder must be stopped in order to clean the Seiher housings blocked by outgoing polymer, and the Seiher housings then have to be disassembled, cleaned and reassembled. These downtimes make processes using Seiher housings uneconomic (short operating times).

JP-A 1/202 406 likewise describes a process in which moist rubber-like polymers are first partially dewatered in an extruder, in a region provided with Seiher housings, and the remaining water is then removed in one atmospheric and three downstream reduced-pressure devolatilization zones. In addition to the disadvantageous, susceptible Seiher housings, this process also includes an expensive reduced-pressure devolatilization region.

JP-A 57 16 7303 describes a process in which polymer particles are separated off from their aqueous suspension (slurry) by filtration and are further dewatered in an extruder, the water emerging through Seiher housings. The extruder content is then heated up, melted under pressure, devolatilized twice, mixed with additives and discharged. The main disadvantage of this process is the use of the Seiher housings in the extruder, which readily become blocked, resulting in short operating times.

JP 4008 754 describes a process for the preparation of a thermoplastic resin, in which the latex of a diene graft rubber is dewatered in a twin-screw extruder, the water emerging through Seiher housings. The extruder content is then devolatilized and melted, after which a melt of a vinyl polymer is fed to the extruder. This process, too, requires the use of the problematic Seiher housings.

U.S. Pat. No. 4,802,769 describes an extruder in which a slurry of a rubber polymer is processed together with a styrene/acrylonitrile copolymer to give a thermoplastic. The water passes in liquid form through Seiher housings and emerges as steam through a three-stage devolatilization process. In addition to the Seiher housings which become blocked, the disadvantages are that the extruder part provided with Seiher housings is heated and that a multiple pressure build-up due to retarding elements occurs in the devolatilization part, with the result that the polymer material is subjected to high thermal and mechanical stress.

It is an object of the present invention to provide a process which does not have the disadvantages described. In particular, it is intended to provide a process which permits the preparation of an impact-resistant thermoplastic comprising at least one water-moist elastomer component and one or more thermoplastic, brittle polymers in a technically simple manner, as far as possible in one process step.

It is a further object of the present invention to provide a process by means of which polymer blends can be prepared in one process step by mixing of the thermoplastic with further polymers. In particular, a process should be provided which has the flexibility to permit the blending of even the most different polymers with one another and also the blending of greatly varying quantity mixing ratios of thermoplastic polymer and elastomer component (giving toughened thermoplastics having the low to very high rubber contents) and which at the same time is reliable in operation.

Furthermore, the process should enable the thermoplastic or the polymer blend to be mixed with conventional additives (for example, stabilizers, dyes, fillers, etc.) without additional process steps, it also being possible to introduce the additives in the form of masterbatches.

The process should furthermore subject the polymer material to very little thermal and mechanical stress.

Finally, the process should have a high throughput and ensure a longer operating time without problems. In particular, it should be ensured that the residual water can be removed in a trouble-free manner even over a relatively long operating time of the process.

We have found that these objects are achieved by the process defined at the outset, wherein the components A, B, C and D are fed to an extruder which has at least two screws rotating in the same direction or in opposite directions and having a screw diameter $D_{Screw}$, and, in the conveying direction (downstream), the extruder being essentially composed of at least one metering section in which elastomer component A is fed to the extruder by a metering means, at least one squeeze section which serves for dewatering the elastomer component A and contains at least one retarding element and in each case at least one associated dewatering orifice which is upstream of the (first) retarding element by a distance corresponding to at least one screw diameter $D_{Screw}$, at least one feed section in which the thermoplastic polymer B is introduced as a melt into the extruder, at least one plastication section provided with mixing and/or kneading elements, at least one devolatilization section which is provided with at least one devolatilization orifice and in which the remaining water is removed as steam, and a discharge zone, wherein some or all of the water emerging from the dewatering orifices is present in the liquid phase, and wherein the components C and/or D are fed to one or more of the stated extruder sections together or separately from one another, either together with the components A and/or B or separately from A and B.

We have also found the thermoplastic molding materials prepared by the processes, and the use of these molding materials for the production of films, fibers and moldings. Finally, we have found an extruder for the preparation of the thermoplastics.

The principle of the process and the preferred embodiments of the process are described below, those components of the extruder which are referred to as sections or zones not necessarily being identical to the individual components, such as barrel parts and screw segments, from which the extruder is assembled. A section or a zone consists as a rule of a plurality of components. The numbers stated in connection with the sections or zones refer to FIG. 1, which schematically shows one of the possible embodiments of the extruder.

In a preferred embodiment, the extruder is a twin-screw extruder. However, it is also possible to use an extruder having three or more screws or an extruder having a main screw of large diameter and, arranged around this, small screws (planetary arrangement).

The screws of the extruder, furthermore, preferably rotate in the same direction. However, rotation in opposite directions is also possible. Particular preference is given to a twin-screw extruder having screws rotating in the same direction.

The water-moist elastomer component A containing up to 60% by weight of residual water is, as a rule, a moist solid. It is, for example, a graft rubber which was obtained by emulsion polymerization, precipitated and partially dewatered to a residual water content of up to 60% by weight, where the partial dewatering may be effected, for example, by filtration, settling out, pressing out, decanting, centrifuging or thermal drying. The elastomer content A containing residual water is fed to metering section 2 of the extruder. The metering section usually consists of an automatic metering means and the actual metering orifice (or a plurality of metering orifices). The metering means is in the form of, for example, a conveying screw which conveys or forces the conveyed material into the metering orifice. It is also possible for component A to be metered by suitable gravimetric or volumetric metering means and to be metered under gravity into the feed orifice of the extruder. The component A is drawn in and vented by means of a suitable screw geometry in the metering section.

If there are a number of elastomer components A, these may be metered together or separately from one another into the same metering orifice or into different metering orifices of the metering section 2.

In a possible embodiment, a vent section 1 is located upstream in the direction opposite the conveying direction of the extruder. Typically, it has one or more vent orifices through which occluded air in the elastomer component can escape.

In a further embodiment, the component C and/or the component D or proportions of the total added amount of components C and/or D are metered into the vent orifice or into one or more further orifices arranged in the vent section. If both components C and D are fed in, this may be done by feeding said components together through one orifice or through different orifices (one each for C and D).

In another, preferred embodiment, the component C and/or the component D or proportions of the total added amount of components C and/or D are metered into the metering orifice of the metering section or into one or more further orifices arranged in the metering section. This may also be effected in a further metering section 2' which is downstream of the first metering section 2 and for which essentially the statements made in connection with section 2 are applicable.

Components C and D can be fed into the metering sections of the extruder, separately from A or together with A in one of the following combinations: A+C+D, A/C+D, A+C/D, A+D/C and A/C/D (where / means separately from, each by means of a separate orifice, and + means together with, through a common orifice).

In both stated embodiments, the metering means for the components C and/or D may be, for example, a conveying screw as in the case of the metering of the elastomer component A, a pump or an extruder, depending on the state of aggregation of C and D.

In the region of the metering sections and—if present—in the vent section, the extruder screws are formed, as a rule, as conventional conveying screws. For the purposes of this application, conventional conveying screws are, for example, elements having an earth mixer profile (completely self-purging), elements having a thrust edge, elements having a trapezoidal profile and elements having a rectangular profile, screw elements having conveying threads of large pitch (pitch larger than the diameter of the screw) in the conveying direction (termed RGS elements) or combinations of these elements, it also being possible for the screws to be equipped with a smaller or larger number of flights compared with the squeeze section. Double-flight and single-flight screw elements may also be used together here. The screw elements of the conveying screw may be identical or different in the stated sections; furthermore, they can have identical or different pitches.

The water-moist elastomer component is conveyed downstream into the first squeeze section.

In the first squeeze section 3, a part of the residual water contained in the elastomer component is mechanically removed (squeezing). The material is conveyed against a retarding element which acts as an obstacle and is present, as a rule, at the end of the squeeze section. This builds up a pressure, which forces water out of the elastomer component. The pressure can be built up by different arrangements of screw elements, kneading elements or other retarding elements, depending on the Theological behavior of the rubber. In principle, all commercial elements in the apparatus serving for building up the pressure are suitable.

Examples of possible retarding elements are pushed-over, conveying screw elements screw elements having a pitch opposite to the conveying direction, including screw elements having conveying threads of large pitch (pitch larger than the diameter of the screw) opposite to the conveying direction (termed LGS elements)

kneading blocks having nonconveying kneading disks of different width kneading blocks having a back-conveying pitch kneading blocks having a conveying pitch barrel disks, eccentric disks and blocks configured therefrom toothed mixing elements of various design neutral retarding disks (baffles)

mechanically adjustable restrictors (sliding barrel, radial restrictors, central restrictors).

Two or more of the retarding elements may be combined with one another. The retarding effect can also be adapted to the respective elastomer by means of the length and the intensity of the individual retarding elements.

In the squeeze section, the screw elements situated before the restricted flow zone (before the first retarding element) are generally constructed as conventional conveying screws. In an embodiment, the conveying screws used here have a helix angle which becomes shallower toward the restricted flow zone. This construction brings about a relatively slow rise in pressure, the term transition zone being frequently used, which can be advantageous for dewatering certain elastomer components.

In another preferred embodiment, the increase in pressure occurs without a prior transition zone (ie. the conveying screw generally has a constant pitch in the squeeze section), and therefore occurs immediately before or in the restricted flow zone.

In another preferred embodiment, mixing elements and/or kneading elements, examples of which are given below for the plastication section 5, are used in the squeeze section between the dewatering orifice and the first retarding element. This embodiment can be advantageous in particular for certain consistencies and morphologies of the elastomer component.

In the first squeeze section, all structural features and all operating parameters of the extruder are preferably tailored to one another in such a way that, at the chosen screw speed, the elastomer material is conveyed and compressed but is plasticated or partly melted only to a minor extent, if at all, and is not completely melted.

The squeeze section 3 of the extruder preferably contains, for a pressure build-up, screw elements having a pitch opposite to the conveying direction and/or corresponding kneading blocks.

The water forced out of the elastomer material in the first squeeze section leaves the extruder in the liquid phase and not as steam. In a less preferred embodiment, up to 20% by weight of the water removed in this section emerge as steam.

The squeeze section is provided with one or more dewatering orifices. The dewatering orifices are preferably located at the top of the extruder; however, lateral or downward pointing arrangements are possible. Furthermore, dewatering orifices are preferably provided with an apparatus which prevents the emergence of the conveyed elastomer A. Retaining screws are particularly preferably used for this purpose.

The dewatering orifices are designed in a manner known per se and their geometry substantially corresponds to the known devolatilization orifices, as used for removing gaseous substances from an extruder. The dewatering orifices used are ones whose shape and dimensions are chosen so that the orifices cannot be blocked by the extruder content. Cut-outs and/or holes in the extruder barrel are particularly preferably used as dewatering orifices. Examples of suitable dewatering orifices are circular holes or holes with the shape of a figure 8 lying on its side (ie. two circular holes directly adjacent to one another), where the longitudinal axis of the figure 8 may, for example, be arranged at a right angle (perpendicular) to, or parallel to (along), the conveying direction of the extruder. The dewatering orifice may moreover be positioned centrally on the longitudinal axis of the extruder (ie. symmetrically) or to one side of the longitudinal axis of the extruder (ie. asymmetrically).

In a preferred embodiment, the dewatering orifices used are not Seiher housings, or similar components which readily become blocked, such as screens. Seiher housings are, to be specific and as already described, susceptible to blockages.

According to the invention, the dewatering orifice belonging to the retarding elements is located before the retarding element or, in the case of a plurality of retarding elements, before the first retarding element upstream by a distance corresponding to at least one screw diameter $D_{Screw}$, preferably from 1 to 4 $D_{Screw}$, very particularly preferably from 1 to 3.5 $D_{Screw}$. distance is to be understood as the distance between the middle of the dewatering orifice and the beginning of the first retarding element.

As a result of this distance between retarding elements and dewatering orifice, the dewatering orifice is not present in that region of the extruder in which the pressure of the polymer conveyed against the retarding elements is very high (pressure maximum). Technically simple apparatuses, such as retaining screws, are therefore sufficient for sealing the orifices to prevent polymer from emerging.

The temperature of the emerging water is in general from 20 to 95° C., preferably from 25 to 70° C., measured at the outlet orifice.

In the first squeeze section, from 10 to 90, preferably from 20 to 80, % by weight of the initially contained residual water are usually removed, depending on the elastomer component and on the residual water content initially present.

To improve the dewatering performance of the first squeeze section, it can be advantageous to use retarding elements and/or kneading elements in the metering section or between the metering section and the first dewatering orifice. The type and number of these retarding and/or kneading elements are selected so that the elastomer component is subjected to a degree of mechanical load, thus changing its nature so that it becomes easier to dewater, but not, or only to a subordinate extent, plasticizing it or causing it to begin to melt, and certainly not melting it completely.

In a preferred embodiment, the extruder is not heated in the metering sections for the elastomer component A and in the squeeze sections. In one embodiment, the extruder is cooled in these stated sections.

The partially dewatered elastomer component A is transported away via the retarding zones and enters the next extruder section.

In an embodiment preferred for the preparation of some impact-resistant thermoplastics, the first squeeze section 3 just described is followed by a second squeeze section 3', which in turn consists of a conveying section and a retarding zone effective as an obstacle. The statements made in connection with the first squeeze section 3 are essentially applicable to this section.

In the optional second squeeze section, the elastomer component is further dewatered, once again up to 80, preferably up to 65, % by weight of the water present initially (before the extrusion) being removed. As a result of the mechanical energy introduced by the rotating extruder screw, the temperature of the elastomer component in the second squeeze section generally increases to values up to 250° C.

The process is preferably designed so that the contents of the extruder are exposed to temperatures which are as low as possible. The extruder is therefore preferably designed and operated so that the temperature of the elastomer component does not exceed 200° C., particularly preferably 180° C. These temperatures are based on the restricted flow zones.

From 20 to 99% by weight of the water removed in the second section emerges as liquid, and the remaining amount to 100% by weight as steam. However, the dewatering orifices are preferably designed so that the amount of water emerging in liquid form is 70% by weight or more, in spite of the high material temperature. For this purpose, the geometries of extruder screws and of the retaining screws are designed in such a way that the water remains predominantly in liquid form, for example as a result of a pressure build-up in the outlet zone or as a result of other measures.

As a rule, the temperature of the water leaving the extruder is from 40 to 130, preferably from 50 to 99° C.

The partially dewatered elastomer component can be melted to a relatively large extent or completely melted at the end of the second squeeze section 3' and can be present in the form of relatively large fused agglomerates.

The extruder may contain further squeeze sections behind the second squeeze section 3', particularly when the initial residual water content of the elastomer component A is high.

The water which is squeezed out generally leaves the extruder through all of the dewatering orifices which are present. Depending on the properties of the elastomer component and on the amount which is metered in (degree of filling of the extruder) and its residual water content, it is also possible, however, that the water which is squeezed out is not discharged at all of the available dewatering orifices, and the other dewatering orifices can be described as dry, ie. no or virtually no water passes out therethrough. This has proven not to be at all disadvantageous.

In a preferred embodiment, the water removed in the squeeze sections, including any elastomer particles which it may carry, can be collected and, for example, used in the preparation of components A, B, C and/or D. Thus, the water which is squeezed out may, for example, be used again in the preparation of the elastomer component A or for precipitating the rubber from its latex. This recycling of the water improves the cost-effectiveness and the environmental compatibility of the process, since there is less waste water.

After passing the last squeeze section, the elastomer component has been freed from a considerable part of the residual water (component A') and enters a feed section 4 in which one or more feed orifices for the thermoplastic polymer B are present. It is advantageous that the polymer B is introduced in the form of its melt. If the feed section contains a plurality of feed orifices, these may be arranged, for example, one behind the other along an imaginary axis in the longitudinal direction of the extruder, in a circle along the extruder circumference or along an imaginary helix around the extruder.

The melt of the polymer B can be fed in by means of an extruder or by conveying means, such as melt pumps or metering screws.

In the feed section 4 described, the component C and/or the component D or proportions of the total added amount of the components C and/or D may be introduced into the extruder, in addition to the melt of a thermoplastic polymer B. These components may be present as a melt or liquid and in this case are generally metered in by metering means as also used for feeding the melt of the polymer B or, if the component is liquid, by means of a liquid pump. In the case of solid components C and/or D, the metering is usually effected as described in the case of component A.

The components C and D can be fed to the extruder separately from B or together with B, in one of the following combinations: B+C+D, B/C+D, B+C/D, B+D/C and B/C/D (where / means separately from, each by means of a separate orifice, and + means together with, through a common orifice).

The components C and/or D or proportions of the total added amount of the components C and/or D, in unmelted or not completely melted form, may also be fed to section 4 or the above-described sections 1 and 2 of the extruder by means of a positive metering element. Such a metering element is, for example, an extruder, in particular a twin-screw extruder having intermeshing screws running in opposite directions.

The use of a melt pump, of an extruder (ie. side extruder) or of a metering pump as a metering means for the components C and/or D is preferred.

In the region of feed section 4 in which the melt of the thermoplastic polymer B and, if required, the components C and/or D are fed in, the screw may, for example, be in the form of a conveying screw which is capable of homogenizing the mixture of elastomer component A and the melt of thermoplastic B and, if required, components C and/or D only to a small extent. The statements made with regard to the metering section are applicable to the design of the conveying screw.

In a preferred embodiment, in addition to section 4 which is present between the (last) squeeze section and the (first) plastication section 5 (see below), the extruder has, at another point, further sections 4', 4", etc. in which a melt of the thermoplastic polymer B is likewise fed in. In particular, these further feed sections 4', 4", etc. are located downstream in the region behind the feed section 4 and before the end of the extruder.

The feeding of the melt of B via a number of feed sections, 4, 4', 4", etc. can be advantageous in particular if specific product formulations are desired. In a preferred embodiment, there are further feed sections 4', 4", etc. for the melt of the thermoplastic polymer B downstream between the plastication and devolatilization sections, between two devolatilization sections, between the last devolatilization section and the discharge zone, or in the discharge zone. The last two of these embodiment are preferred.

If the melt of B is fed to the extruder via a number of feed sections 4, 4', 4", etc., the distribution of the total amount of B across the different sections 4, 4', 4", etc. can vary within wide limits. In the case of two feed sections 4 and 4', the weight ratio [melt of B in section 4/melt of B in section 4'] may be from 9.5:0.5 to 0.5:9.5, preferably from 9:1 to 1:9, and particularly preferably from 8.5:1.5 to 1.5:8.5. The properties of the product of the process can be influenced to a certain extent by distributing the total amount of B across the individual sections 4, 4', 4", etc.

The feed section for the thermoplastic melt B and, if required, components C and/or D is followed by a plastication section 5 which is provided with mixing and/or kneading elements.

The mixing and/or kneading elements homogenize the polymer blend with simultaneous melting of the dewatered elastomer component A' and, if required, of the components C and/or D.

Suitable mixing and kneading elements are the components familiar to a person skilled in the art, for example screw elements having a small pitch in the conveying direction, kneading blocks having narrow or broad, conveying or nonconveying kneading disks, screw elements having a pitch opposed to the conveying direction, barrel disks, eccentric disks and blocks comprising these disks, toothed mixing elements or melt mixing elements or a combination of such elements. It is also possible to use the screw elements given as examples for the retarding elements, since each retarding element generally also has a mixing effect. Preference is given to the use of different combinations of kneading blocks as mixing and kneading elements for plastication. Baffles may also be used with advantage. All of the abovementioned elements may be used in normal designs corresponding to the diameter of the extruder barrel or else as a specific design with reduced diameter.

Furthermore, all of the abovementioned elements may also be modified in another manner, eg. to achieve gentle processing conditions for the contents of the extruder, or more intensive mixing. Conveying threads and/or kneading blocks may be provided with intermeshing elements having apertures and/or reduced diameters.

The choice of the type, number and dimensions of the screw elements in the plastication section depends on the components of the polymer mixture, in particular on the viscosity and softening temperature and the miscibility of the components.

The extruder may contain one or more further plastication sections 5' after the plastication section described, for example if the homogenization and the melting of the blend was incomplete in the first plastication section. The statements made in connection with the first plastication section are correspondingly applicable to the further plastication section or sections.

It is possible to feed the component C and/or the component D or proportions of the total added amount of the components C and/or D to at least one of the plastication sections, these components being fed separately from one another through different orifices or together through a common orifice.

In a preferred embodiment, the melt of the thermoplastic polymer B and, if required, the components C and/or D are fed to the extruder at the beginning of the plastication section. In this embodiment, the feed section for the melt of the thermoplastic polymer B accordingly coincides with the beginning of the plastication section 5.

In a further particular embodiment, the melt of the thermoplastic polymer B and, if required, the components C and/or D are fed to the extruder at one or more points in the plastication section. In this embodiment also, therefore, the feed section 4 coincides with the plastication section 5.

In a further particular embodiment of the extruder, one or more further plastication sections are present before feed section 4 in which the melt of the thermoplastic polymer is fed in, ie. behind the last squeeze section. In this plastication section 5", the very substantially dewatered elastomer component A', for example the rubber powder, is first homogenized and plasticated alone. The melt of the thermoplastic polymer B and, if required, the components C and/or D are accordingly introduced into a viscous melt of the elastomer component A' in this embodiment. In this case, the plastication section 5 downstream of the mixing of melt B and C and/or D (section 4) serves merely for homogenizing the mixture of the components already present in the plastic state.

The choice of the variants described for feeding in melt B and optionally the components C and/or D, ie.
  into a conveying section before the plastication section,
  at the beginning of the plastication section,
  at one or more points in the plastication section,
  into a conveying section between two plastication sections,
depends on the ratios and on the physical and chemical properties of the components A, B, C and D to be mixed. The viscosities of the melts of elastomer component A' and thermoplastic polymer B and (if metered into this part of the extruder) of the components C and/or D, the softening temperatures of the components, their thermal load capacity or tendency to decompose at relatively high temperatures, the compatibility in terms of miscibility or wettability of the components, the residual water content of the polymer blend comprising elastomer component A' and thermoplastic polymer B and, if required, the components C and D and, in the case of particulate components, their particle size and particle size distribution may be mentioned merely by way of example.

The last plastication section is followed by one or more devolatilization sections 6 and/or 6', each of which is provided with one or more devolatilization orifices. In the devolatilization sections, the remaining residual water which was not mechanically removed in the squeeze sections is partially or completely removed. Because the temperatures of the polymer melt are usually above 100° C., the water generally emerges completely as steam. The energy required for evaporating the water has, as a rule, already been introduced into the plastication sections. However, it is also possible to supply the energy in a conventional manner by heating the extruder barrel.

The devolatilization orifices are preferably present at the top of the extruder. However, other arrangements are also possible, cf. the statements made in connection with the position of the feed orifices for the melt of the thermoplastic polymer B, which are also applicable in context for the devolatilization orifices.

A lateral arrangement (on one side or both sides) of the devolatilization orifices is likewise preferred, and particular preference is given to a lateral arrangement in which all of the surface areas of the devolatilization orifice face downward, so that discharged polymer constituents and condensed steam cannot flow back into the extruder. Insofar as the properties of the extruder contents permit this, the devolatilization orifices may also be situated on the underside of the extruder. The devolatilization orifices are preferably provided with a connection piece.

The devolatilization orifices may be operated under atmospheric, reduced or superatmospheric pressure, and all devolatilization orifices may have the same pressure or different pressures. In the case of reduced pressure, the absolute pressure is usually from 100 to 500 mbar; in the case of devolatilization under superatmospheric pressure, an absolute pressure of up to 20 bar is generally set. However, it is preferable to operate the devolatilization sections under atmospheric pressure.

The number of devolatilization sections and the number, arrangement and dimensions of the devolatilization orifices depend on the water content of the polymer entering the devolatilization sections and on the desired water content of the end product. In a preferred embodiment, an extruder having two devolatilization sections is used.

The devolatilization orifices of the devolatilization sections can be provided with apparatuses, for example retaining screws, which prevent the conveyed material from emerging from the extruder through the orifices. However, such apparatuses are preferably not used.

Following the removal of a part of the residual water contained in the elastomer component A in the squeeze sections 3 and 3', from about 10 to 80, preferably from 20 to 75, % by weight of the residual water contained in the elastomer component A before extrusion are removed in all devolatilization sections 6 and 6' together.

In the region of the devolatilization sections, the extruder screws are generally in the form of conventional conveying screws, as described for the metering sections. It can, however, be useful to incorporate kneading or mixing elements into the screws in the region between the devolatilization orifices, in order to replace energy consumed in evaporating the water.

In a preferred embodiment, the extruder has, between the last devolatilization section and the discharge zone 8, a further section 7 in which the components C and/or D (or proportions of the total added amount of components C and/or D) are fed to the extruder, either together or separately from one another, by at least one metering means. The further section 7 is accordingly located directly before the discharge zone 8.

This further section 7 is provided with mixing and/or kneading elements, as mentioned by way of example for the plastication sections. These elements homogenize the polymer blend. The metering means required for feeding in C and/or D have also already been described.

Kneading blocks having nonconveying kneading disks and/or kneading blocks having a conveying pitch, kneading blocks having different land widths, toothed mixing elements and melt mixing elements are preferably used as mixing and/or kneading elements, and extruders having one or two screws (ie. side extruders) and/or pumps, in paraticular melt pumps, are preferably used as metering means.

In a preferred embodiment, the total amount of the components C and/or D which are to be introduced into the extruder is fed to the extruder in one or more of the following sections: devolatilization section 6, further section 7 and metering section 2.

The components C and/or D may be added together through at least one feed orifice or separately through a plurality of feed orifices.

The last section of the extruder is the discharge zone 8. It consists of a conveying screw and a closed barrel part which is terminated by a defined discharge orifice. The discharge zone is preferably heated.

A preferably used discharge orifice is a die head which is formed, for example, as a die plate or die strip, where the dies may have a circular (perforated die plate or strip), slot-like or other shape. The product discharged as an extrudate in the case of a perforated die plate is cooled, for example in water, and granulated in the usual manner. Particularly where a slot die is used, cube granulation is possible.

In a particular embodiment, instead of the perforated die plate or strip described above, with the otherwise usual combination of extrudate take-off, water bath and granulator, a particular die head with subsequent underwater granulation is used. Here, the polymer melt passes through a die plate having preferably round holes arranged in a circle, is cut under water by rotating blades and is cooled under water, the polymer solidifying to more or less round, bead-like particles. With regard to the arrangement of the holes, however, arrangements other than circular ones and hole shapes other than round ones are also commonly used.

In a further embodiment, a hot face cutting method is used instead of the discharge via a die strip, cooling in a water bath and granulation, the polymer melt emerging from the die head not being cooled by liquid but, after emergence from the die head, being comminuted (granulated) while still in the hot state, after brief cooling in air. The resulting granules are then further cooled or cooled during further processing if this is necessary. Further processing in the hot state or direct extrusion of sheets, films, pipes and profiles is also possible.

In a further embodiment, underwater extrudate granulation is used, in which the melt is discharged as extrudate from a die plate and is immediately wetted by a stream of water and is then introduced, via a sloping plane, into a water bath, and is granulated after cooling.

In a further particular embodiment, the discharge zone 8 is provided with an apparatus for filtering the melt emerging from the extruder, said apparatus, viewed in the conveying direction, being present before the die head. Such apparatuses for continuous melt filtration are known to a person skilled in the art and are commercially available. If necessary, a conveyor element, for example a melt pump or a screw conveyor, may be installed between discharge zone and melt filtration in order to build up in the melt the pressure required for passing through the filter unit.

The melt emerging from the filtration apparatus is granulated and is further processed by another method, as described above.

The water content of the emerging polymer (the extrudate moisture content) is as a rule from 0.05 to 1.5% by weight, based on this polymer. The temperature of the polymer melt emerging from the discharge orifice is as a rule from 180 to 350° C., depending on the type of polymers used. It is advantageous to hold the temperatures low enough for the thermal stress on the polymer to be as small as possible, without, however, affecting the satisfactory preparation of the desired product.

As is generally known, the various zones of an extruder can be individually heated or cooled in order to establish an optimum temperature profile along the screw axis. Furthermore, it is familiar to a person skilled in the art that the individual sections of the extruder may usually be of different lengths. To achieve particular product properties, it may specifically be useful to cool certain parts of the extruder or to control their temperature so that it diverges from that of the remainder of the extruder.

The temperatures and lengths of the individual sections to be chosen in the specific case differ depending on the chemical and physical properties of the components and their ratios, said properties having been mentioned above by way of example.

The same also applies to the screw speed, which may vary within a wide range. A speed of the extruder screws of from 50 to 1200 rpm may be mentioned merely by way of example. A speed range of from 100 to 700 rpm is preferred. It is advantageous to design and to operate the extruder in such a way that mean shear rates of from 15 to 450 $s^{-1}$ are established in the region of the squeeze sections at a screw speed of from 50 to 1200 rpm. Shear rates of from 35 to 260 $s^{-1}$ are advantageously established for the preferred screw speed of from 100 to 700 rpm. However, depending on the type, amount and properties of the components used, it may be advantageous to operate at mean shear rates outside this range.

The extruder screws may be any commercially available screw, for example a screw having an external diameter of from 10 to 1000 mm. The screw diameter which is suitable depends on, for example, the type and amount of the components metered into the extruder. The external diameter of the screw may be constant along the extruder or vary within particualr limits.

Depending on the type and amounts of the components, screws having a smaller flight depth or screws having a larger flight depth (ie. deep-flighted screws) may be used in the extruder. Preference is given to the use of screws having a flight depth ratio $D_{Screw,\ external}/D_{Screw,\ internal}$ of from 1.2 to 1.8, preferably from 1.4 to 1.6, and particularly preferably from 1.45 to 1.58. A commercially available embodiment of the extruder which is suitable for the novel process has, for example, a flight depth ratio of 1.55, ie. a large flight depth.

In another embodiment, screws having a medium flight depth, particularly those having a flight depth ratio of from 1.4 to 1.48, are used. This embodiment of the extruder is also commercially available and may be advantageous for certain components and certain amounts of the components. Screws with flight depth ratios of more than 2 are also suitable.

The number of starts n of the screw may vary, in particular with n being 1, 2 or 3. Double-flight screws are preferably used. However, screws having other numbers of starts or those screws which have sections with different numbers of starts may also be used.

Use may in particular be made of extruder screws in which the flight depth ratio varies along the screw, there being a relationship between the number of starts and the flight depth ratio (multi-stage screw). Use may preferably be made of a screw in which the change from 3 to 2 starts is accompanied by a change in the flight depth from a low to a high flight depth ratio.

Any polymer which has elastomeric properties and can be fed into an extruder may be used as the elastomer component A. A mixture of different elastomer components A may also be used.

In particular, particulate rubbers are used as component A, as mentioned at the outset. Those rubbers which have a grafted-on shell comprising other, generally nonelastomeric polymers are particularly preferred. In a preferred embodiment of the invention, the graft rubber types fed to the extruder as partially dewatered material contain up to 50, particularly preferably from 25 to 40, % by weight of residual water.

One embodiment of the invention consists in a process in which elastomer components A used are graft rubbers which have a two-stage or multistage structure and in which the elastomeric base or graft stages are obtained by polymerization of one or more of the monomers butadiene, isoprene, chloroprene, styrene, alkylstyrene, $C_1$–$C_{10}$-alkyl esters of acrylic acid or of methacrylic acid and small amounts of other monomers, including crosslinking monomers, and in which the hard graft stages are obtained by polymerizing one or more of the monomers styrene, alkylstyrene, acrylonitrile and methyl methacrylate.

Graft particles A of polymers based on butadiene/styrene/acrylonitrile, n-butyl acrylate/styrene/acrylonitrile, butadiene/n-butyl acrylate/styrene/acrylonitrile, n-butyl acrylate/methyl methacrylate, n-butyl acrylate/styrene/methyl methacrylate, butadiene/styrene/acrylonitrile/methyl methacrylate and butadiene/n-butyl acrylate/methyl methacrylate/styrene/acrylonitrile are preferred. Polar monomers carrying up to 10% by weight of functional groups or crosslinking monomers may be present as polymerized units in the core or shell.

In this embodiment, styrene/acrylonitrile (SAN) copolymers, copolymers of α-methylstyrene and acrylonitrile, polystyrene, polymethyl methacrylate, polyvinyl chloride or mixtures of these polymers are used as thermoplastic polymers B.

SAN polymers, copolymers of α-methylstyrene and acrylonitrile, polymethyl methacrylate (PMMA) or mixtures of these polymers are preferred.

Polycarbonates, polyalkylene terephthalates, such as polybutylene terephthalate and polyethylene terephthalate, polyoxymethylene, polymethyl methacrylate, polyphenylene sulfide, polysulfones, polyether sulfones and polyamides and mixtures of these thermoplastics may also be used as thermoplastic polymers B. Thermoplastic elastomers, such as thermoplastic polyurethane (TPU), may furthermore be used as polymer B.

Copolymers based on styrene/maleic anhydride, styrene/imidated maleic anhydride, styrene/maleic anhydride/imidated maleic anhydride, styrene/methyl methacrylate/imidated maleic anhydride, styrene/methyl methacrylate, styrene/methyl methacrylate/maleic anhydride, methyl methacrylate/imidated maleic anhydride, styrene/imidated methyl methacrylate, imidated PMMA or mixtures of these polymers may likewise be used as component B.

In all stated thermoplastic polymers B, some or all of the styrene may be replaced by α-methylstyrene or by styrenes alkylated on the nucleus or by acrylonitrile.

Among the last-mentioned polymers B, those based on α-methylstyrene/acrylonitrile, styrene/maleic anhydride, styrene/methyl methacrylate and copolymers containing imidated maleic anhydride are preferred.

Known examples of the elastomer component A are polymers of conjugated dienes, such as butadiene, having an outer graft shell based on a vinylaromatic compound, for example SAN copolymers. Graft rubbers based on crosslinked polymers of $C_1$–$C_{10}$-alkyl esters of acrylic acid, such as n-butyl acrylate or ethylhexyl acrylate, grafted with polymers based on vinylaromatic compounds, such as SAN copolymers, are also known. Graft rubbers which essentially contain a copolymer of conjugated dienes and $C_1$–$C_{10}$-alkyl acrylates, for example a butadiene/n-butyl acrylate copolymer, and an outer graft stage comprising SAN copolymer, polystyrene or PMMA are also conventionally used.

The preparation of such graft rubbers by the usual methods, in particular by emulsion or suspension polymerization, is known.

Graft rubbers based on SAN-grafted polybutadiene are described, for example, in DT 24 27 960 and EP-A 258 741, and those based on SAN-grafted poly-n-butyl acrylate are described in German Application DAS 1,260,135 and German Laid-Open Application DOS 3,149,358. Further details of SAN-grafted poly(butadiene/n-butyl acrylate) mixed rubbers are given in EP-A 62 901.

In the case of the graft rubbers mentioned in the last paragraph, copolymers of styrene and acrylonitrile are used, for example, as thermoplastic polymers B. They are known and some of them are also commercially available and have, as a rule, a viscosity number VN (determined according to DIN 53 726 at 25° C., 0.5% strength by weight in dimethylformamide) of from 40 to 160 ml/g, corresponding to an average molecular weight $\overline{M}_w$ of from about 40000 to 2000000.

The thermoplastic polymers B are preferably prepared by continuous mass or solution polymerization, the melt obtained being fed continuously and directly to the extruder, for example by means of a melt pump, if necessary after removal of the solvents. However, preparation by emulsion, suspension or precipitation polymerization is also possible, the polymer being separated from the liquid phase in an additional operation.

Details of the preparation processes are described, for example in Kunststoffhandbuch, Editors R. Vieweg and G. Daumiller, Vol. V "Polystyrol", Carl-Hanser-Verlag, Munich, 1969, page 118 et seq.

If the elastomer component A is an SAN-grafted polybutadiene, a molding material known as ABS (acrylonitrile/butadiene/styrene) is formed by incorporating the SAN. If an SAN-grafted alkyl acrylate is used as component A, ASA molding materials (acrylonitrile/styrene/acrylate) are formed.

In another embodiment, graft rubbers having a residual water content of up to 60% by weight and based on polydienes and/or polyalkyl acrylates as well as SAN and/or PMMA are used, said rubbers being composed of more than two graft stages.

Examples of such multistage graft particles are particles which contain a polydiene and/or polyalkyl acrylate as the core, a polystyrene or SAN polymer as the first shell and another SAN polymer having a different styrene: acrylonitrile weight ratio as the second shell, or particles comprising a polystyrene, polymethyl methacrylate or SAN polymer core, a first shell of polydiene and/or polyalkyl acrylate and a second shell of polystyrene, polymethyl methacrylate or SAN polymer. Further examples are graft rubbers comprising a polydiene core, one or more polyalkyl acrylate shells and one or more polymer shells of polystyrene, polymethyl methacrylate or SAN polymer or similarly composed graft rubbers having an acrylate core and polydiene shells.

Copolymers having a multistage core-shell structure of crosslinked alkyl acrylate, styrene and methyl methacrylate and an outer shell of PMMA are also commonly used. Such multistage graft rubbers are described, for example, in German Laid-Open Application DOS 3,149,046. Graft rubbers based on n-butyl acrylate/styrene/methyl methacrylate and having a shell of PMMA are described, for example, in EP-A 512 333, any other prior art composition of such graft rubbers also being possible. Such rubbers are used as impact modifiers for polyvinyl chloride and preferably for impact-resistant PMMA. Once again, the stated SAN copolymers and/or PMMA are used as thermoplastic polymers B. If the elastomer component A is a multishell core/shell polymer based on n-butyl acrylate/methyl methacrylate and the polymer B is PMMA, impact-resistant PMMA is accordingly obtained. In this embodiment too, preferred components B are the stated SAN copolymers, polystyrene and/or PMMA.

The diameter of the particulate graft rubbers A is generally from 0.05 to 20 μm. If these are the generally known graft rubbers of small diameter, the diameter is preferably from 0.08 to 1.5 μm, particularly preferably from 0.1 to 0.8 μm.

In the large-particled graft rubbers prepared for example by means of suspension polymerization, the diameter is preferably from 1.8 to 18 μm, in particular from 2 to 15 μm. Such graft rubbers of large diameter are described, for example, in German Laid-Open Application DOS 4,443, 886.

The particle size distribution of the graft rubber particles may be narrow or broad and may have one maximum (monomodal) or else two maxima (bimodal). Particle size distributions having more than two maxima are also possible.

The components C are further polymers, in particular thermoplastic polymers. Suitable components C are all polymers which were mentioned for the thermoplastic polymer B. If the components B and C are identical, the component C is fed to the extruder at another point than the component B.

If the monomers of which the polymers B and C are composed are identical, the components B and C may differ with respect to the amounts of the monomers—for example the polymers B and C may be styrene/acrylonitrile copolymers which differ in the styrene:acrylonitrile ratio. If the amounts of the monomers are also identical, the polymers B and C may have different average molecular weights $\overline{M}_w(B)$ and $\overline{M}_w(C)$, measurable, for example, as different viscosity numbers VN(B) and VN(C).

In addition to the monomers mentioned inter alia for the component B, ie. styrene, acrylonitrile, methyl methacrylate and vinyl chloride, the following other compounds may also be used as essential monomers for the preparation of C:

α-methylstyrene and styrenes or α-methylstyrenes each of which is substituted on the nucleus by $C_1$–$C_8$-alkyl
methacrylonitrile
$C_1$–$C_{20}$-alkyl esters of acrylic acid and of methacrylic acid
maleic acid, maleic anhydride and maleimides
vinyl ethers and vinylformamide.

Polymers based on α-methylstyrene/acrylonitrile and methyl methacrylate/alkyl acrylate, and copolymers of alkyl esters of acrylic acid or of methacrylic acid and styrene or acrylonitrile or styrene and acrylonitrile are examples of the component C.

Further preferred polymers C are
styrene/acrylonitrile copolymers having different amounts of the monomers compared with the component B, or different average molecular weights $\overline{M}_w$,
copolymers of α-methylstyrene and acrylonitrile,
polymethyl methacrylates,
polycarbonates,
polybutylene terephthalate and polyethylene terephthalate,
polyamides,
copolymers of at least two of the monomers styrene, methyl methacrylate, maleic anhydride, acrylonitrile and maleimides, for example copolymers of styrene, maleic anhydride and phenylmaleimide,
impact-modified polystyrene (HIPS), the rubber component of the HIPS that is used being, in particular, polybutadiene,
ABS prepared by means of mass polymerization or solution polymerization,
thermoplastic polyurethanes(TPU).

The preparation of these polymers is known to a person skilled in the art and is therefore discussed only briefly below.

Polymethyl methacrylates are to be understood as meaning in particular polymethyl methacrylate (PMMA) and copolymers based on methyl methacrylate with up to 40% by weight of further copolymerizable monomers, as obtainable, for example, under the names Lucryl® from BASF Aktiengesellschaft or Plexiglas® from Röhm GmbH. A copolymer of 98% by weight of methyl methacrylate and 2% by weight of methyl acrylate as a comonomer may be mentioned merely by way of example (Plexiglas® 8N, from Röhm). A copolymer of methyl methacrylate with styrene and maleic anhydride as comonomers is also suitable (Plexiglas® HW55, from Röhm).

Suitable polycarbonates are known per se. They are obtainable by interfacial polycondensation, for example by the processes of DE-B-1 300 266, or by reacting diphenyl carbonate with bisphenols according to the process of DE-A-14 95 730. A preferred bisphenol is 2,2-di(4-hydroxyphenyl)propane, generally referred to as bisphenol A.

Instead of bisphenol A, it is also possible to use other aromatic dihydroxy compounds, in particular 2,2-di(4-hydroxyphenyl)pentane, 2,6-dihydroxynaphthalene, 4,4'-dihydroxydiphenyl sulfone, 4,4'-dihydroxydihenyl [sic] ether, 4,4'-dihydroxydiphenyl sulfite, 4,4'-dihydroxydiphenylmethane, 1,1-di(4-hydroxyphenyl)ethane or 4,4'-dihydroxybiphenyl or mixtures of the abovementioned dihydroxy compounds.

Particularly preferred polycarbonates are those based on bisphenol A or on bisphenol A together with up to 30 mol % of the abovementioned aromatic dihydroxy compounds.

Polycarbonates are obtainable, for example, under the trade names Makrolon® (from Bayer), Lexan® (from General Electric), Panlite® (from Tejin) or Calibre® (from Dow). The relative viscosity of these polycarbonates is in general from 1.1 to 1.5, in particular from 1.28 to 1.4 (measured at 25° C. in a 0.5% strength by weight solution in dichloromethane).

Polybutylene terephthalate and polyethylene terephthalate are prepared as a rule in a manner known per se, by condensation of terephthalic acid or esters thereof with butanediol or ethanediol under catalysis. The condensation is advantageously carried out in two stages (precondensation and polycondensation). Details are to be found, for example, in Ullmann's Encyclopädie der Technischen Chemie, 4th Edition, Volume 19, pages 61–88. Polybutylene terephthalate is commercially available, for example, as Ultradur® (from BASF).

Preferred polyamides are very generally those having an aliphatic semicrystalline or partly aromatic and amorphous structure of any type, and blends thereof. Appropriate products are available, for example, under the trade name Ultramid® (from BASF).

The preparation of rubber-modified, impact-modified polystyrene (HIPS) is known to the person skilled in the art. A polybutadiene rubber is generally dissolved in monomeric styrene and the resultant solution of polybutadiene in styrene is then polymerized. The polymerization is, for example, carried out in two steps, the step frequently termed prepolymerization being carried out in a first reactor and the subsequent main polymerization in a subsequent reactor. The polymerization initiators used are the usual free-radical generators, but redox systems may also be used. Additionally molecular weight regulators, for example, may be among the ingredients. The preparation is generally carried out either by the continuous solution process (both steps in solution) or batchwise by the process frequently termed the bulk/suspension process (first step in bulk, second step in suspension). Details may be found, for example, in U.S. Pat. No. 4,362,850 and Ullmanns Encyclopedia of Technical Chemistry, Vol. A21, p. 644–647. A process for continuous solution polymerization of the ABS is also described in EP-A 477 764.

Polymers prepared by solution polymerization are known per se. Graft polymers consisting of solution ABS generally have a average particle diameter $d_{50}$ of from 700 to 20,000 nm, preferably from 1000 to 15,000 nm, and are thus markedly larger than ABS graft particles prepared by the emulsion polymerization process which is otherwise usually used or by other polymerization processes.

In the solution polymerization process, in contrast to suspension or emulsion polymerization, both the monomers and the polymers produced from them are dissolved in the selected solvent. Solution ABS is generally prepared in a manner similar to the preparation of rubber-modified, impact-modified polystyrene. A polybutadiene rubber is generally dissolved in a mixture of monomeric styrene and monomeric acrylonitrile, and the resultant solution of polybutadiene in styrene/acrylonitrile is then polymerized. The polymerization is, for example, carried out in two steps, the step frequently termed prepolymerization being carried out in a first reactor and the subsequent main polymerization in a subsequent reactor. The polymerization initiators used are the usual free-radical generators, but redox systems may also be used. Additionally molecular weight regulators, for example, may be among the ingredients. The preparation is generally carried out either by the continuous solution process (both steps in solution) or batchwise by the process frequently termed the bulk/suspension process (first step in bulk, second step in suspension). Details may be found, for example, in U.S. Pat. No. 4,362,850 and Ullmanns Encyclopedia of Technical Chemistry, Vol. A21, p. 644–647. A process for continuous solution polymerization of the ABS is also described in EP-A 477 764.

Thermoplastic polyurethanes are usually prepared by reacting organic, preferably aromatic, diisocyanates, such as diphenylmethane 4,4'-diisocyanate, with polyhydroxy compounds which are preferably essentially linear, for example polyetherols, or polyesterols, such as polyalkylene glycol polyadipates, and diols acting as chain extenders, such as butane-1,4-diol, in the presence of catalysts, for example tertiary amines (such as triethylamine) or organic metal compounds.

The ratio of NCO groups of the diisocyanates to the sum of the OH groups (from the polyhydroxy compounds and chain-extending diols) is preferably about 1:1.

The preparation of the TPU is preferably carried out by the belt process in which the stated components and the catalyst are mixed continuously by means of a mixing head and the reaction mixture is applied to a conveyor belt. The belt passes through a zone heated to 60–200° C., the mixture undergoing reaction and solidifying.

Details of the TPU are to be found, for example, in EP-A 443 432. TPU are available, for example, under the trade name Elastollan® (from Elastogran).

Component C may furthermore essentially comprise copolymers of $C_2$–$C_8$-alkenes, such as ethylene, propene and butene with vinylaromatics, polar comonomers, such as acrylic acid and methacrylic acid, the $C_1$–$C_{10}$-alkyl esters of acrylic acid and of methacrylic acid, other mono- or polyfunctional ethylenically unsaturated acids, such as maleic acid, maleic anhydride, fumaric acid, itaconic acid and esters thereof, in particular glycidyl esters, esters with $C_1$–$C_8$-alkanols and esters with aryl-substituted $C_1$–$C_8$-alkanols, carbon monoxide, nonaromatic vinyl compounds, such as vinyl acetate, vinyl propionate and vinyl alkyl ethers, basic monomers, such as hydroxyethyl acrylate, dimethylaminoethyl acrylate, vinylcarbazole, vinylaniline, vinylcaprolactam, vinylpyrrolidone, vinylimidazole and vinylformamide, acrylonitrile, methacrylonitrile, which are prepared in a generally known manner.

In a preferred embodiment, a polymer C which can be prepared from 40–75% by weight of ethylene, 5–20% by weight of carbon monoxide and 20–40% by weight of n-butyl acrylate is used (commercially available as Elvaloy® HP-4051 (from DuPont), or a polymer which can be prepared from 50–98.9% by weight of ethylene, 1–45% by weight of n-butyl acrylate and 0.1–20% by weight of one or more compounds selected from the group consisting of acrylic acid, methacrylic acid and maleic anhydride. The preparation of the last-mentioned embodiments is usually carried out by free radical polymerization and is described in U.S. Pat. No. 2,897,183 and U.S. Pat. No. 5,057,593.

Copolymers of butadiene (or substituted butadienes) with comonomers, preferably, for instance, styrene, methyl methacrylate or acrylonitrile are also suitable, for example nitrile rubber (NBR) or styrene/butadiene rubber (SBR). Some or all of the olefinic double bonds in these copolymers may have been hydrogenated.

Other suitable components C are butadiene/styrene copolymers which have block structures and are nonhydrogenated, hydrogenated or partially hydrogenated. They are preferably prepared by the method of anionic polymerization in solution using organometallic compounds, such as sec-butyllithium, linear block rubbers being formed, for example those having the structure styrene/butadiene (two-block) or styrene/butadiene/styrene (three-block). These blocks may be separated from one another by polymers having a random distribution, and furthermore the blocks may also contain minor amounts of units of the respective other monomers.

The presence of small amounts of an ether, in particular tetrahydrofuran (THF), in addition to the initiator, results in the formation of polymer chains which, starting from a butadiene-rich initial segment, have an increasing styrene content along the chain and finally end in a homopolystyrene terminal segment. Details of the preparation process are described in DE-A 31 06 959. Polymers C which have such a composition may be hydrogenated or partially hydrogenated are also suitable.

Other suitable components C are polymers having a star-like structure which are obtained by linking a plurality of polymer chains, mainly three-block polymers of the type styrene/butadiene/styrene, via polyfunctional molecules. Suitable linking agents are, for example, polyepoxides, for example epoxidated linseed oil, polyisocyanates, such as 1,2,4-triisocyanatobenzene, polyketones, such as 1,3,6-hexanetrione, and polyanhydrides, as well as dicarboxylic esters, such as diethyl adipate, and silicon halides, such as $SiCl_4$, metal halides, such as $TiCl_4$, and polyvinylaromatics, such as divinylbenzenes. Further details of the preparation of these polymers are to be found in, for example, DE-A 26 10 068.

It is also possible to use mixtures of at least two of the polymers previously stated for C as component C.

In addition to the elastomer component A and polymers B and C, the molding materials prepared by the novel process may contain, as further component D, additives, for example waxes, plasticizers, lubricants and mold release agents, pigments, dyes, dulling agents, flameproofing agents, antioxidants, light stabilizers and heat stabilizers, fibrous and pulverulent fillers and reinforcing agents and antistatic agents in the usual amounts for these agents.

The additives D may be present in pure form and in the solid, liquid or gaseous state or may be used as a mixture of the pure substances with one another. They may also be used in a formulation which facilitates metering, for example as a solution or as a dispersion (emulsion or suspension). A formulation in the form of a masterbatch, ie. a concentrated mixture with a thermoplastic polymer compatible with the extruder content, is also suitable and is preferred in many cases.

The polymers C and the additives D can be fed to the extruder in one or more of the stated extruder sections. In a preferred embodiment, the components C and D are introduced into the extruder—separately from the elastomer component A and the thermoplastic polymer B—in vent section 1, in metering section 2 and/or in section 4 in which the polymer is fed to the extruder. In a further preferred embodiment, the components C and/or D are fed to the extruder in a further section 7.

The components C and D can be metered into the same section or sections or each into different extruder sections, and both 100% of C and 100% of D may be fed to the extruder in one section or distributed over a plurality of sections.

The exact embodiment of the feed of C and D depends on the stated physical and chemical properties of the components A to D and on their ratios. For example, it is possible for additives D having low heat resistance not to be fed to the extruder until the discharge zone, with the result that thermal degradation of the substances D is substantially prevented.

The thermoplastic molding materials prepared by the process can be processed by the generally conventional methods to give moldings. Examples are extrusion (for pipes, profiles, fibers, films and sheets), injection molding (for shaped articles of all kinds) and calendering and rolling (for sheets and films).

An important advantage of the novel process is that a considerable part of the residual water which is present in the partially dewatered elastomer component A is mechanically removed as early as the squeeze zones, so that less thermal energy need be used in the downstream extruder sections for evaporating the remaining water. A substantial energy saving results.

A further advantage of the novel process is that the extruder can be operated at low [sic] temperatures than, for example, in the process described in EP-A 534 235, so that the elastomer component A and the polymers consisting of the components A, B, C and D are processed in a gentler manner. Furthermore it is generally possible to dispense with pressure-generating screw elements in the devolatilization part, which subject the polymer to considerable thermal and mechanical stress.

By incorporating a partially dewatered elastomer component A into the melt of a thermoplastic polymer B and mixing in further polymers C and additives D, it is possible to prepare rubber-modified thermoplastic molding materials of very different types and containing very different additives with a high throughput in a single process step, assuming compatibility or at least partial compatibility of the elastomer component with the other components and sufficient heat stability. In particular, a very wide range of polymer blends can be prepared by mixing in further polymers C. Because the process makes it possible to feed the polymer B to the extruder at either one or more points, the product properties can be changed advantageously.

Compared with the prior art processes, the novel process furthermore has the advantage that no Seiher housings susceptible to blockage are used. This makes it possible to operate the process over a long time without the extruder having to be switched off, cleaned and started up again owing to blockages in the dewatering zone.

The novel arrangement of the extruder can be assembled in an economical manner with the aid of commercial extruder components according to the modular principle. Such components are available in the form of screw sections of different designs and associated barrel sections, and permit exact adaptation of the extruder to the specific compounding problem.

EXAMPLES

Screw is to be understood in each case as meaning a twin screw rotating in the same direction. The designation of the extruder sections which is used in the description is stated in brackets.

a) Extruder configuration I

A twin-screw extruder of the type ZSK 40 from Werner and Pfleiderer, Stuttgart, was used, said extruder consisting of 12 sections. Their arrangement in the downstream direction was as follows:

Section 1: Length 4 D, unheated, with metering orifice at the top, which is provided with a metering means ESB 45 from Werner and Pfleiderer, and neutrally conveying screw (Metering section 2 for elastomer component A).

Section 2: Length 4 D, unheated, with dewatering orifice at the top (bore in the extruder barrel in the form of a horizontal figure eight with its longitudinal axis in the conveying direction), which is provided with a retaining screw, and conveying screw (Squeeze section 3, front part).

Section 3: Length 4 D, unheated, without orifices, contains kneading block and thread opposite to the conveying direction as retarding elements; the distance between the first retarding element and the associated dewatering orifice in Section 2 is 3 D (Squeeze section 3, rear part).

Section 4: Length 4 D, unheated, without orifices and with conveying screw.

Section 5: Length 4 D, heated, with lateral orifice through which the melt of polymer B is introduced by means of a ZSK 53 side extruder (from Werner and Pfleiderer); the screw of the main extruder contains conveying elements and kneading blocks (Section 4, in which the melt of the thermoplastic polymer B is fed in).

Section 6: Length 4 D, heated, without orifices, with a screw section which contains kneading blocks (Plastication section 5).

Section 7: Length 4 D, heated, with devolatilization orifice at the top and conveying screw, devolatilization is operated under atmospheric pressure (First devolatilization section 6).

Section 8: Length 4 D, heated, with devolatilization orifice at the top and conveying screw, devolatilization is operated under atmospheric pressure (Second devolatilization section 6').

Sections 9–12: Length 4 D each, heated, without orifices and with conveying screw (Discharge zone 8, front part)

Termination: Die strip with cylindrical holes (Discharge zone 8, rear part).

The screw diameter is D=40 mm. The screw is deep-flighted (large flight depth) and the flight depth ratio $D_{Screw,\ external}/D_{Screw,\ internal}$ is 1.55. The screw has a two-flight design.

b) Extruder configuration II

A twin-screw extruder of the type ZSK 40 from Werner and Pfleiderer, Stuttgart, was used, said extruder consisting of 12 sections. Their arrangement in the downstream direction was as follows:

Section 1: Length 4 D, unheated, with metering orifice at the top, which is provided with a metering means ESB 45 from Werner and Pfleiderer, and neutrally conveying screw (Metering section 2 for elastomer component A).

Section 2: Length 4 D, unheated, with dewatering orifice at the top (bore in the extruder barrel in the form of a horizontal figure eight with its longitudinal axis in the conveying direction), which is provided with a retaining screw, and conveying screw (Squeeze section 3, front part).

Section 3: Length 4 D, unheated, without orifices, contains kneading block and thread opposite to the conveying direction as retarding elements; the distance between the first retarding element and the associated dewatering orifice in Section 2 is 3 D (Squeeze section 3, rear part).

Section 4: Length 4 D, unheated, without orifices and with conveying screw.

Section 5: Length 4 D, heated, with lateral orifice through which the melt of polymer B is introduced by means of a ZSK 53 side extruder (from Werner and Pfleiderer); the screw of the main extruder contains conveying elements and kneading blocks (Section 4, in which the melt of the thermoplastic polymer B is fed in).

Section 6: Length 4 D, heated, without orifices, with a screw section which contains kneading blocks (Plasticating section 5).

Section 7: Length 4 D, heated, with devolatilization orifice at the top and conveying screw, devolatilization is operated under atmospheric pressure (First devolatilization section 6).

Section 8: Length 4 D, heated, with devolatilization orifice at the top and conveying screw, devolatilization is operated under atmospheric pressure (Second devolatilization section 6').

Section 9: Length 4 D, heated, with lateral metering orifice which is provided with a ZSK 25 or ZSK 53 side extruder (depending on throughput, from Werner and Pfleiderer); the screw of the main extruder contains conveying elements and kneading blocks (Further section 7 in which the components C and/or D are fed in, front part)

Section 10: Length 4 D, heated, with orifice at the top which is provided with an inlet connection; Screw with kneading blocks (Further section 7 in which the components C and/or D are fed in, rear part)

Sections 11–12: Length 4 D each, heated, without orifices and with conveying screw (Discharge zone 8, front part).

Termination: Die strip with cylindrical holes (Discharge zone 8, rear part).

The screw diameter is D=40 mm. The screw is deep-flighted (large flight depth) and the flight depth ratio $D_{Screw, external}/D_{Screw, internal}$ is 1.55. The screw has a two-flight design.

c) Extruder configuration III

A twin-screw extruder of the type ZSK 40 from Werner and Pfleiderer, Stuttgart, was used, said extruder consisting of 12 sections. Their arrangement in the downstream direction was as follows:

Section 1: Length 4 D, unheated, with metering orifice at the top, which is provided with a metering means ESB 45 from Werner and Pfleiderer, and neutrally conveying screw (Metering section 2 for elastomer component A).

Section 2: Length 4 D, unheated, with dewatering orifice at the top (bore in the extruder barrel in the form of a horizontal figure eight with its longitudinal axis in the conveying direction), which is provided with a retaining screw, and conveying screw (First squeeze section 3, front part).

Section 3: Length 4 D, unheated, without orifices, contains kneading block and thread opposite to the conveying direction as retarding elements; the distance between the first retarding element and the associated dewatering orifice in Section 2 is 3 D (First squeeze section 3, rear part).

Section 4: Length 4 D, unheated, with dewatering orifice at the top (bore in the extruder barrel in the form of a horizontal figure eight with its longitudinal axis in the conveying direction), which is provided with a retaining screw, and conveying screw (Second squeeze section 3', front part).

Section 5: Length 4 D, unheated, without orifices, contains kneading block and thread opposite to the conveying direction as retarding elements; the distance between the first retarding element and the associated dewatering orifice in Section 4 is 3 D. (Second squeeze section 3', rear part).

Section 6: Length 4 D, heated, with lateral orifice through which the melt of the polymer B is introduced by means of a ZSK 53 side extruder (from Werner and Pfleiderer); the screw of the main extruder contains conveying elements and kneading blocks. (Section 4 in which the melt of the thermoplastic polymer B is fed in).

Section 7: Length 4 D, heated, without orifices, with a screw section which contains kneading blocks (Plastication section 5).

Section 8: Length 4 D, heated, with devolatilization orifice at the top and conveying screw, devolatilization is operated under atmospheric pressure (Second devolatilization section 6).

Section 9: Length 4 D, heated, with devolatilization orifice at the top and conveying screw, devolatilization is operated under atmospheric pressure (Second devolatilization section 6').

Section 10: Length 4 D, heated, with lateral metering orifice which is provided with a ZSK 25 side extruder (from Werner & Pfleiderer); the screw of the main section contains conveying elements and kneading blocks (Further section 7 in which the components C and/or D are fed in, front part).

Section 11: Length 4 D, heated, with orifice at the top which is provided with an inlet connection; screw with kneading blocks (Further section 7 in which the components C and/or D are fed in, rear part).

Section 12: Length 4 D, heated, without orifices and with conveying screw (Discharge zone 8, front part).

Termination: The strip with cylindrical holes (Discharge zone 8, rear part).

The screw diameter is D=40 mm. The screw is deep-flighted (large flight depth) and the flight depth ratio $D_{screw, external}/D_{Screw, internal}$ is 1.55. The screw has a two-flight design.

d) Extruder configuration IV

A twin-screw extruder of the type ZSK 40 from Werner and Pfleiderer, Stuttgart, was used, said extruder consisting of 12 sections. Their arrangement in the downstream direction was as follows:

Section 1: Length 4 D, unheated, with metering orifice at the top, which is provided with a metering means ESB 45 from Werner and Pfleiderer, and neutrally conveying screw (Metering section 2 for elastomer component A, forward part).

Section 2: Length 4 D, unheated, without orifices, with conveying screw (Metering section 2 for elastomer component A, rear part).

Section 3: Length 4 D, unheated, with dewatering orifice at the top (hole in the extruder barrel in the form of a horizontal figure eight with its longitudinal axis in the conveying direction) contains, as retarding elements, kneading block and thread opposite to the conveying direction; the distance between the first retarding element and the associated dewatering orifice is 1.5 D (First squeeze section 3).

Section 4: Length 4 D, unheated, with dewatering orifice at the top (hole in the extruder barrel in the form of a horizontal figure eight with its longitudinal axis in the conveying direction), provided with a retaining screw, contains conveying screw and, as retarding elements, kneading block and thread opposite to the conveying direction; the distance between the first retarding element and the associated dewatering orifice is 1.5 D (Second squeeze section 3').

Section 5: Length 4 D, heated, with lateral orifice through which the melt of polymer B is introduced by means of a ZSK 53 side extruder (from Werner and Pfleiderer); the screw of the main extruder contains conveying elements and kneading blocks (Section 4, in which the melt of the thermoplastic polymer B is fed in).

Section 6: Length 4 D, heated, without orifices, with a screw section which contains kneading blocks (Plastication section 5).

Section 7: Length 4 D, heated, with devolatilization orifice at the top and conveying screw, devolatilization is operated under atmospheric pressure (First devolatilization section 6).

Section 8: Length 4 D, heated, with devolatilization orifice at the top and conveying screw, and kneading block between the two devolatilization orifices, devolatilization is operated under atmospheric pressure (Second devolatilization section 6').

Section 9: Length 4 D, heated, with lateral metering orifice which is provided with a ZSK 25 or ZSK 53 side extruder (depending on throughput, from Werner and Pfleiderer); the screw of the main extruder contains conveying elements and kneading blocks (Further section 7 in which the components C and/or D are fed in, front part)

Section 10: Length 4 D, heated, with orifice at the top which is provided with an inlet connection; screw with kneading blocks (Further section 7 in which the components C and/or D are fed in, rear part)

Sections 11–12: Length 4 D each, heated, without orifices and with conveying screw (Discharge zone 8, front part).

Termination: Die strip with cylindrical holes (Discharge zone 8, rear part).

The screw diameter is D=40 mm. The screw is deep-flighted (large flight depth) and the flight depth ratio $D_{Screw, external}/D_{Screw, internal}$ is 1.55. The screw has a two-flight design.

e) Extruder configuration V

A twin-screw extruder of the type ZSK 58 from Werner and Pfleiderer, Stuttgart, was used, said extruder consisting of 10 sections. Their arrangement in the downstream direction was as follows:

Section 1: Length 4 D, unheated, with metering orifice at the top, which is provided with a metering means ESB 45 from Werner and Pfleiderer, and neutrally conveying screw (Metering section 2 for elastomer component A).

Section 2: Length 4 D, unheated, with dewatering orifice at the top (hole in the extruder barrel in the form of a horizontal figure eight with its longitudinal axis in the conveying direction), provided with a retaining screw, and conveying screw, and kneading block and thread opposite to the conveying direction as retarding elements; the distance between the first retarding element and the associated dewatering orifice in section 2 is 1 D (First squeeze section 3).

Section 3: Length 4 D, unheated, with dewatering orifice at the top (hole in extruder barrel in the form of a horizontal figure eight with its longitudinal axis in the conveying direction), provided with a retaining screw, and conveying screw (Second squeeze section 3', front part).

Section 4: Length 4 D, unheated, without orifices, contains kneading blocks and thread opposite to the conveying direction as retarding elements; the distance between the first retarding element and the associated dewatering orifice in section 3 is 3 D (Second squeeze section 3', rear part).

Section 5: Length 4 D, heated, with lateral orifice through which the melt of the polymer B is introduced by means of a ZSK 53 side extruder (from Werner and Pfleiderer); the screw of the main extruder contains neutral and conveying elements and kneading blocks (Section 4, in which the melt of the thermoplastic polymer B is fed in).

Section 6: Length 4 D, heated, without orifices, with a screw section which contains kneading blocks (Plastication section 5).

Section 7: Length 4 D, heated, with devolatilization orifice at the top and conveying screw, devolatilization is operated under atmospheric pressure (First devolatilization section 6).

Section 8: Length 4 D, heated, with devolatilization orifice at the top and conveying screw and kneading block between the two devolatilization orifices, devolatilization is operated at atmospheric pressure (Second devolatilization section 6').

Section 9+10: Length 4 D each, heated, without orifices and with conveying screw (Discharge zone 8, front part).

Termination: Die strip with cylindrical holes (Discharge zone 8, rear part). The screw diameter is D=58 mm. The screw is deep-flighted (large flight depth) and the flight depth ratio $D_{Screw, external}/D_{Screw, internal}$ is 1.55. The screw has a two-flight design.

f) Extruder configuration VI

A twin-screw extruder of the type ZSK 40 from Werner and Pfleiderer, Stuttgart, was used, said extruder consisting of 12 sections. Their arrangement in the downstream direction was as follows:

Section 1: Length 4 D, unheated, with metering orifice at the top, which is provided with a metering means ESB 45 from Werner and Pfleiderer, and neutrally conveying screw (Metering section 2 for elastomer component A, front part).

Section 2: Length 4 D, unheated, without orifices, with conveying screw and a kneading block with back-conveying pitch (metering section 2 for elastomer component A, rear part).

Section 3: Length 4 D, unheated, with dewatering orifice at the top (hole in extruder barrel in the form of a horizontal figure eight with its longitudinal axis in the conveying direction), contains a short transition zone with a length of 0.6 D as retarding elements, a kneading block and a thread opposite to the conveying direction; the distance between the first retarding element and the associated dewatering orifice is 1.6 D (First squeeze section 3).

Section 4: Length 4 D, unheated, with dewatering orifice at the top (hole in the extruder barrel in the form of a horizontal figure eight with its longitudinal axis in the conveying direction), provided with a retaining screw, contains conveying screw and kneading block and thread opposite to the conveying direction as retarding elements; the distance between the first retarding element and the associated dewatering orifice is 1.5 D (Second squeeze section 3').

Section 5: Length 4 D, heated, with lateral orifice through which the melt of the polymer B is introduced by means of a ZSK 53 side extruder (from Werner and Pfleiderer); the screw of the main extruder contains conveying elements and kneading blocks (Section 4 in which the melt of the thermoplastic polymer B is fed in).

Section 6: Length 4 D, heated, without orifices, with a screw section which contains kneading blocks (Plastication section 5).

Section 7: Length 4 D, heated, with devolatilization orifice at the top and conveying screw, devolatilization is operated under atmospheric pressure (First devolatilization section 6).

Section 8: Length 4 D, heated, with devolatilization orifice at the top and conveying screw, and kneading block between the two devolatilization orifices, devolatilization is operated under atmospheric pressure (Second devolatilization section 6').

Section 9: Length 4 D, heated, with lateral metering orifice which is provided with a ZSK 25 or ZSK 53 side extruder (depending on throughput, from Werner and Pfleiderer); the screw of the main extruder contains conveying elements and toothed mixing elements (Further section 7 in which the components C and/or D are fed in, front part)

Section 10–12: Length 4 D each, heated, without orifices and with conveying screw (Discharge zone 8, front part).

Termination: Die strip with cylindrical holes (Discharge zone 8, rear part).

The screw diameter is D=40 mm. The screw is deep-flighted (large flight depth) and the flight depth ratio $D_{Screw, external}/D_{Screw, internal}$ is 1.55. The screw has a two-flight design.

g) Extruder configuration VII

A twin-screw extruder of the type ZSK 40 from Werner and Pfleiderer, Stuttgart, was used, said extruder consisting of 12 sections. Their arrangement in the downstream direction was as follows:

Section 1: Length 4 D, unheated, with metering orifice at the top, which is provided with a metering means ESB 45 from Werner and Pfleiderer, and neutrally conveying screw (Metering section 2 for elastomer component A).

Section 2: Length 4 D, unheated, with dewatering orifice at the top (hole in the extruder barrel in the form of a horizontal figure eight with its longitudinal axis in the conveying direction), provided with a retaining screw, and conveying screw (Squeeze section 3, front part).

Section 3: Length 4 D, unheated, without orifices, contains kneading block and thread opposite to the conveying direction as retarding elements; the distance between the first retarding element and the associated dewatering orifice in section 2 is 3 D (Squeeze section 3, rear part).

Section 4: Length 4 D, heated, with lateral orifice through which the melt of the polymer B is introduced by means of a ZSK 53 side extruder (from Werner and Pfleiderer); the screw of the main extruder contains conveying elements and kneading blocks (Section 4 in which the melt of the thermoplastic polymer B is fed in).

Section 5–6: Length 4 D, heated, without orifices, with a screw section which contains kneading blocks (Plastication section 5).

Section 7: Length 4 D, heated, with devolatilization orifice at the top and conveying screw, devolatilization is operated under atmospheric pressure (First devolatilization section 6).

Section 8: Length 4 D, heated, with devolatilization orifice at the top and conveying screw, and kneading block between the two devolatilization orifices, devolatilization is operated under atmospheric pressure (Second devolatilization section 6', front part).

Section 9: Length 4 D, heated, without orifices, screw contains conveying elements and kneading blocks (Second devolatilization section 6', rear part).

Section 10–11: Length 4 D, heated, without orifice, screw with kneading blocks (Discharge zone 8, front part)

Section 12: Length 4 D each, heated, without orifices and with conveying screw (Discharge zone 8, middle part).

Termination: Die strip with cylindrical holes (Discharge zone 8, rear part).

The screw diameter is D=40 mm. The screw is deep-flighted (large flight depth) and the flight depth ratio $D_{Screw, external}/D_{Screw, internal}$ is 1.55. The screw has a two-flight design.

h) Polymer components used

The following graft rubbers were used as elastomer component A:

A-1: Graft copolymer comprising 5 stages based on methyl methacrylate or n-butyl acrylate A graft polymer was prepared from 5 different hard or soft stages in emulsion. The specific procedure was as described in EP-A 512 333, Example 1, Table 1 on page 8.

1st stage (hard core): Methyl methacrylate+ethyl acrylate+alkyl methacrylate

2nd stage (soft first shell): n-Butyl acrylate+styrene+alkyl methacrylate

3rd stage (hard second shell): Methyl methacrylate+ethyl acrylate+allyl methacrylate 4th stage (soft third shell): n-Butyl acrylate+styrene+allyl methacrylate 5th stage (hard fourth shell): Methyl methacrylate+ethyl acrylate.

The monomer stated first for each stage is the main monomer in terms of quantity. The precipitated graft polymer was filtered off with suction and dewatered by means of a pilot-scale centrifuge to the water content stated in the Tables.

A-2: Graft polymer based on butadiene and n-butyl acrylate, grafted with SAN

A mixture of vinyl methyl ether, n-butyl acrylate and butadiene was polymerized in emulsion and the latex was agglomerated (average particle size $d_{50}$:310 nm). Graft polymerization was then carried out with a styrene/acrylonitrile mixture. Further details are given in EP-A 62 901, page 11, line 1 to page 12, line 14 (Example 2), the precipitated graft polymer being filtered off with suction and dewatered by means of a pilot-scale centrifuge to the water content stated in the Tables.

A-3: Graft polymer based on butadiene, grafted with SAN

Butadiene was polymerized in emulsion, the latex obtained was agglomerated, a latex having an average particle size $d_{50}$ of 238 nm being formed, and graft polymerization was then effected with a mixture of styrene and acrylonitrile. Further details are given in German Published Application DAS 2,427,960, column 6, line 17 to column 7, line 27, the precipitated graft polymer being dewatered by means of a pilot-scale centrifuge to the water content stated in the Tables.

A-4: Graft polymer based on n-butyl acrylate, grafted with SAN n-Butyl acrylate was polymerized with a crosslinking agent in emulsion to give a latex having an average particle diameter $d_{50}$ of 123 nm. A styrene/acrylonitrile mixture was graft-polymerized onto this latex. Further details are given in EP-A 450 485, column 7, lines 10–24 (Example A), dewatering being carried out by centrifuging to the water content stated in the Tables.

A-5: Graft rubber based on n-butyl acrylate, grafted with styrene and SAN n-Butyl acrylate was polymerized with a crosslinking agent in emulsion in two steps to give a latex having an average particle diameter $d_{50}$ of 410 nm. A first stage comprising polystyrene and a second stage comprising styrene/acrylonitrile copolymer were graft-polymerized onto this latex. With regard to the details, reference may be made to German Laid-Open Application DOS 3,149,358, page 15, line 12 to page 16, line 24, dewatering being effected by centrifuging to the water content stated in the Tables.

The following polymers were used as thermoplastic polymers B:

B-1: Polymethyl methacrylate

A mixture of 99% by weight of methyl methacrylate and 1% by weight of methyl acrylate was polymerized in suspension as described in EP-A 489 318, page 4, line 52 et seq., according to Example 6 (Table on page 7). The viscosity number VN (determined according to DIN 53726 at 25° C., 0.26% strength by weight in chloroform) was 74 ml/g.

B-2: Polymethyl methacrylate

A mixture of 96% by weight of methyl methacrylate and 4% by weight of methyl acrylate was polymerized as described under B-1. The viscosity number VN (determined as in the case of B-1) was 56 ml/g.

B-3: Styrene/acrylonitrile copolymer

A mixture of 75% by weight of styrene and 25% by weight of acrylonitrile was prepared by the continuous solution polymerization method, as described in Kunststoff-Handbuch, Editors Vieweg and Daumiller, Vol. V "Polystyrol", Hanser-Verlag Munich 1969, pages 122–124. The viscosity number VN (determined according to DIN 53726 at 25° C., 0.5% strength by weight in dimethylformamide) was 70 ml/g.

B-4: Styrene/acrylonitrile copolymer

The procedure was as described under B-3, except that a different degree of polymerization was established. The viscosity number (determined as in the case of B-3) was 100 ml/g.

B-5: Styrene/acrylonitrile copolymer

A mixture of 65% by weight of styrene and 35% by weight of acrylonitrile was polymerized as described in the case of B-3. The viscosity number (determined as in the case of B-3) was 80 ml/g.

B-6: Styrene/acrylonitrile copolymer

The procedure was as described under B-5, except that a different degree of polymerization was established. The viscosity number (determined as in the case of B-3) was 60 ml/g.

B-7: Identical to the α-methylstyrene/acrylonitrile copolymer of component C-1.

B-8: Identical to the polycarbonate of component C-3.

B-9: Identical to the solution ABS component C-8.

The following polymers were used as further polymer C:

C-1: α-Methylstyrene/acrylonitrile copolymer

A copolymer of 70% by weight of α-methylstyrene and 30% by weight of acrylonitrile was prepared as described for polymer B. The viscosity number VN (determined as in the case of B-3) was 56 ml/g.

C-2: Ethylene/n-butyl acrylate/carbon monoxide copolymer

A copolymer of about 55% by weight of ethylene, about 15% by weight of carbon monoxide and about 30% by weight of n-butyl acrylate was used, said copolymer being commercially available as Elvaloy® HP-4051 (from DuPont).

C-3: Polycarbonate

A commercial product based on bisphenol A was used (Makrolon® R2800 from Bayer). The viscosity number (determined according to DIN 53726 at 23° C., 0.5% strength by weight in dichloromethane) was 61.4 ml/g.

C-4: Imidated copolymer of styrene and maleic anhydride

A commercial product was used. It consisted of 58 mol % of styrene and 42 mol % of maleic anhydride and was imidated with aniline so that the product contained 1% by weight of free maleic anhydride groups. The commercial product Malekka® MS-NA (from Denka Chemicals) was used. Its average molecular weight $\overline{M}_w$ was 135000.

C-5: Identical to the styrene/acrylonitrile copolymer of component B-6

C-6: Identical to the polymethyl methacrylate of component B-2

C-7: Identical to the styrene/acrylonitrile copolymer of component B-5

C-8: Acrylonitrile/butadiene/styrene polymer prepared by solution polymerization (solution ABS), the polymer containing 23.3% by weight of copolymerized acrylonitrile, 69.7% by weight of copolymerized styrene and 7% by weight of polybutadiene rubber. The average particle size $d_{50}$ was 8.7 μm.

C-9: Acrylonitrile/butadiene/styrene polymer prepared by solution polymerization (solution ABS), the polymer containing 22.8% by weight of copolymerized acrylonitrile, 70.7% by weight of copolymerized styrene and 7% by weight of polybutadiene rubber. The average particle size $d_{50}$ was 9 μm.

The following were used as additives D:

D-1: Tris(nonylphenyl) phosphite (TNPP). The product Irgafos® TNPP (from Ciba-Geigy) was used.

D-2: Octadecyl 3-(3,5-di-tert-butyl-4-hydroxyphenyl)-propionate. The product Irganox® 1076 (from Ciba-Geigy) was used.

D-3: Colorant masterbatch, containing 20% by weight of carbon black and 80% by weight of the styrene/acrylonitrile copolymer of component B-1.

D-4: Stabilizer masterbatch, containing 1% by weight of bis(2,4-di-tert-butylphenyl) pentaerythritol diphosphite (the product Ultranox® 626 from General Electric Plastics), 1% by weight of octadecyl 3-(3,5-di-tert-butyl-4-hydroxyphenyl)propionate (the product Irganox® 1076 from Ciba-Geigy) and 98% by weight of the polymethyl methacrylate of component B-1.

D-5: Stabilizer masterbatch containing 10% by weight of a sterically hindered amine (the product Uvinul® 4050H from BASF), 10% by weight of ethyl 2-cyano-3,3'-diphenylacrylate (the product Uvinul® 3035 from BASF) and 80% by weight of the polymethyl methacrylate of component B-1.

D-6: Copolymer of methyl methacrylate, styrene and maleic anhydride.

A commercial product comprising 75% by weight of methyl methacrylate, 15% by weight of styrene and 10% by weight of maleic anhydride was used (Plexiglas® HW 55 from Röhm or Degalan® HT 120 from Degussa).

D-7: Masterbatch containing 5% by weight of 1,1,3-tri(2'-methyl-4'-hydroxy-5'-tert-butyl(phenyl)butane [sic], 10% by weight of dilauryl β,β'-thiodipropionate and 85% by weight of the styrene/acrylonitrile copolymer of component B-5.

D-8: Diisodecyl phthalate

The components A present as a moist powder was [sic] fed to the extruder via a solids metering means ESB-45, and the melts of the thermoplastic polymers B by means of a side extruder ZSK 53 (from Werner and Pfleiderer). The components C and/or D were present as powder or granules and were likewise introduced into the extruder by means of a side extruder (ZSK 53 or ZSK 25 from the same manufacturer) or by a granule metering means. The liquid components D-1 and D-8 were fed in by means of a pump.

A mixture D* containing 95% by weight of B-1 and 5% by weight of D-2 was prepared from the components B-5 and D-2 [sic]. This mixture was likewise introduced into the extruder by means of a side extruder (ZSK 25).

i) Measurements

The water discharge and the rubber discharge in the first and second squeeze zones and the extrudate moisture content of the emerging end product were measured. These measurements were carried out gravimetrically.

The amount of water emerging as steam was determined by calculating the difference between the initial residual water content and the sum of the liquid water emerging.

Percentages were calculated from the discharges of water, steam and rubber in kg/h. The stated percentages are percentages by weight and, for water and steam, are based on the water content of the rubber fed to the extruder (lines marked with *), which was made equal to 100, and, for rubber, based on the amount of moist rubber fed in (lines marked with **), which was made equal to 100. The extrudate moisture content is based on the end product obtained.

TABLE 1

Extruder configuration I

| Example | I-1 | I-2 | I-3 |
|---|---|---|---|
| Elastomer component A | | | |
| Type | A-1 | A-1 | A-1 |
| Water content [% by weight]* | 37 | 37 | 37 |
| Feed [kg/h]** | 55.6 | 53.9 | 57.2 |
| in Section No. | 1 | 1 | 1 |
| Thermoplastic polymer B | | | |
| Type | B-2 | B-1 | B-1 |
| Feed [kg/h] | 43.1 | 44.2 | 42.0 |
| in Section No. | 5 | 5 | 5 |
| Further polymer C | | | |
| Type | — | — | — |
| Feed [kg/h] | | | |
| in Section No. | | | |
| Additives D | | | |
| Type | | D-4 | D-5 |
| Feed [kg/h] | — | 2.0 | 2.4 |
| in Section No. | | 1 | 1 |
| Feed by[3] | | GM | GM |
| Extruder: | | | |
| Speed [rpm] | 300 | 300 | 300 |
| Temperature in Sections 5–12 [° C.] | 250 | 250 | 250 |
| Squeeze section | | | |
| Water discharge [kg/h][1] | 11.2 = 54% | 11.9 = 60% | 12.7 = 60% |
| Rubber discharge [kg/h][2] | 1.3 = 2% | 1.3 = 2% | 1.4 = 2% |

TABLE 1-continued

Extruder configuration I

| Example | I-1 | I-2 | I-3 |
|---|---|---|---|
| Devolatilization sections Steam discharge [kg/h][1] | 9.2 = 45% | 7.8 = 39% | 8.3 = 39% |
| Extrudate moisture content [% by weight] | 0.2 | 0.2 | 0.2 |

[1] Percentages based on line * = 100
[2] Percentages based on line ** = 100
[3] GM Granule metering

TABLE 2

Extruder configuration II

| Example | II-1 | II-2 | II-3 |
|---|---|---|---|
| Elastomer component A | | | |
| Type | A-2 | A-2 | A-2 |
| Water content [% by weight]* | 28 | 28 | 28 |
| Feed [kg/h]** | 26.0 | 26.0 | 26.0 |
| in Section No. | 1 | 1 | 1 |
| Thermoplastic polymer B | | | |
| Type | B-3 | B-6 | B-4 |
| Feed [kg/h] | 79 | 79 | 79 |
| in Section No. | 5 | 5 | 5 |
| Further polymer C | | | |
| Type | — | — | — |
| Feed [kg/h] | | | |
| in Section No. | | | |
| Additives D | | | |
| Type | D-7 | D-7 | D-7 |
| Feed [kg/h] | 3 | 3 | 3 |
| in Section No. | 9 | 9 | 9 |
| Feed by[3] | SE | SE | SE |
| Extruder (main extruder): | | | |
| Speed [rpm] | 300 | 300 | 300 |
| Temperature in Sections 5–12 [° C.] | 250 | 250 | 250 |
| Squeeze section | | | |
| Water discharge [kg/h][1] | 2.0 = 27% | 1.9 = 26% | 2.7 = 37% |
| Rubber discharge [kg/h][2] | 0.4 = 2% | 0.5 = 2% | 0.6 = 2% |
| Devolatilization sections Steam discharge [kg/h][1] | 5.3 = 73% | 5.4 = 74% | 4.6 = 63% |
| Extrudate moisture content [% by weight] | <0.1 | <0.1 | <0.1 |

[1] Percentages based on line * = 100
[2] Percentages based on line ** = 100
[3] SE Side extruder

| Example | II-4 | II-5 | II-6 |
|---|---|---|---|
| Elastomer component A | | | |
| Type | A-4 | A-3 | A-2 |
| Water content [% by weight]* | 34 | 28 | 21 |
| Feed [kg/h]** | 49.3 | 34.7 | 25.0 |
| in Section No. | 1 | 1 | 1 |
| Thermoplastic polymer B | | | |
| Type | B-6 | B-6 | B-4 |
| Feed [kg/h] | 40 | 75 | 25 |
| in Section No. | 5 | 5 | 5 |
| Further polymer C | | | |
| Type | C-5 | — | C-6 |
| Feed [kg/h] | 8 | | 18 |
| in Section No. | 9 | | 9 |
| Feed by[3] | SE | | SE |

TABLE 2-continued

Extruder configuration II

| Additives D | | | |
|---|---|---|---|
| Type | D-3 | D-8 | — |
| Feed [kg/h] | 8 | 2 | |
| in Section No. | 9 | 10 | |
| Feed by[3] | SE | MP | |
| Extruder (main extruder): | | | |
| Speed [rpm] | 300 | 300 | 300 |
| Temperature in Sections 5–12 [° C.] | 250 | 250 | 250 |
| Squeeze section | | | |
| Water discharge [kg/h][1] | 9.1 = 54% | 3.4 = 35% | 2.2 = 42% |
| Rubber discharge [kg/h][2] | 0.5 = 1% | 0.7 = 2% | 0.3 = 1% |
| Devolatilization sections Steam discharge [kg/h][1] | 7.5 = 45% | 6.2 = 64% | 3.0 = 57% |
| Extrudate moisture content [% by weight] | 0.2 | 0.2 | 0.1 |

[1] Percentages based on line * = 100
[2] Percentages based on line ** = 100
[3] SE Side extruder, MP Metering pump

| Example | II-7 | II-8 | II-9 |
|---|---|---|---|
| Elastomer component A | | | |
| Type | A-3 | A-4 | A-3 |
| Water content [% by weight]* | 29 | 33 | 29 |
| Feed [kg/h]** | 32.0 | 44.7 | 42.4 |
| in Section No. | 1 | 1 | 1 |
| Thermoplastic polymer B | | | |
| Type | B-7 | B-8 | B-5 |
| Feed [kg/h] | 43 | 60 | 50 |
| in Section No. | 5 | 5 | 5 |
| Further polymer C | | | |
| Type | C-5 C-3 | C-5 | C-4 |
| Feed [kg/h] | 9  30 | 10 | 20 |
| in Section No. | 9  9 | 9 | 9 |
| Feed by[3] | SE  SE | SE | SE |
| Additives D | | | |
| Type | D-6 | D-7 | D-7 |
| Feed [kg/h] | 3 | 3 | 3 |
| in Section No. | 1 | 9 | 9 |
| Feed by[3] | GM | SE | SE |
| Extruder (main extruder): | | | |
| Speed [rpm] | 300 | 300 | 300 |
| Temperature in Sections 5–12 [° C.] | 250 | 250 | 250[4] |
| Squeeze section | | | |
| Water discharge [kg/h][1] | 4.2 = 45% | 7.2 = 49% | 6.2 = 50% |
| Rubber discharge [kg/h][2] | 0.8 = 3% | 1.0 = 2% | 0.9 = 2% |
| Devolatilization sections Steam discharge [kg/h][1] | 5.1 = 55% | 7.4 = 50% | 6.1 = 50% |
| Extrudate moisture content [% by weight] | <0.1 | 0.2 | <0.1 |

[1] Percentages based on line * = 100
[2] Percentages based on line ** = 100
[3] SE Side extruder, GM Granule metering
[4] Extruder (main extruder) from Section 9: 280° C., side extruder: 280° C.

TABLE 3

Extruder configuration III

| Example | III-1 | III-2 | III-3 |
|---|---|---|---|
| Elastomer component A | | | |
| Type | A-3 | A-3 | A-5 |
| Water content [% by weight]* | 29 | 29 | 30 |
| Feed [kg/h]** | 46.0 | 38.0 | 50.0 |
| in Section No. | 1 | 1 | 1 |
| Thermoplastic polymer B | | | |
| Type | B-6 | B-5 | B-5 |
| Feed [kg/h] | 32 | 50 | 46 |
| in Section No. | 6 | 6 | 6 |
| Further polymer C | | | |
| Type | C-1 | — | — |
| Feed [kg/h] | 16 | | |
| in Section No. | 10 | | |
| Feed by[7] | SE | | |
| Additives D | | | |
| Type | — | D-1  D*[5] | D-3  D-3 |
| Feed [kg/h] | | 0.4  4.0[6] | 10  1.6 |
| in Section No. | | 11  10 | 10  1 |
| Feed by[7] | | MP  SE | SE  SE |
| Extruder (main extruder): | | | |
| Speed [rpm] | 300 | 300 | 300 |
| Temperature in Sections 6–12 [° C.] | 250 | 250 | 250 |
| 1st squeeze section | | | |
| Water discharge [kg/h][1] | 3.5 = 26% | 2.5 = 23% | 9.4 = 63% |
| Rubber discharge [kg/h][2] | 0.7 = 2% | 0.9 = 2% | 1.1 = 2% |
| 2nd squeeze section | | | |
| Water discharge [kg/h][1] | 2.7 = 20% | 3.2 = 29% | 0.2 = 1% |
| Rubber discharge [kg/h][2] | 0.4 = 1% | 0.2 = 1% | <0.1 = <1% |
| Devolatilization sections Steam discharge [kg/h][1] | 7.1 = 53% | 5.2 = 47% | 5.4 = 36% |
| Extrudate moisture content [% by weight] | <0.1 | 0.1 | 0.2 |

[1] Percentages based on line * = 100
[2] Percentages based on line ** = 100
[5] D* is a mixture of B-5 and D-2
[6] Feed of mixture corresponding to 3.8 kg/h of B-5 and 0.2 kg/h of D-2
[7] SE Side extruder, MP Metering pump

| Example | III-4 | III-5 | III-6 |
|---|---|---|---|
| Elastomer component A | | | |
| Type | A-5 | A-2 | A-2 |
| Water content [% by weight]* | 35 | 34 | 34 |
| Feed [kg/h]** | 63.0 | 48.3 | 47.4 |
| in Section No. | 1 | 1 | 1 |
| Thermoplastic polymer B | | | |
| Type | B-5 | B-5 | B-5 |
| Feed [kg/h] | 10 | 30 | 30 |
| in Section No. | 6 | 6 | 6 |
| Further polymer C | | | |
| Type | C-2 | C-1 | C-1 |
| Feed [kg/h] | 6 | 12 | 12 |
| in Section No. | 1 | 10 | 10 |
| Feed by[3] | GM | SE | SE |
| Additives D | | | |
| Type | — | — | D-3 |
| Feed [kg/h] | | | 7.3 |
| in Section No. | | | 10 |
| Feed by[3] | | | SE |

TABLE 3-continued

Extruder configuration III

Extruder (main extruder):

| | | | |
|---|---|---|---|
| Speed [rpm] | 300 | 300 | 300 |
| Temperature in Sections 6–12 [° C.] | 250 | 250 | 250 |

1st squeeze section

| | | | |
|---|---|---|---|
| Water discharge [kg/h]$^{1)}$ | 15.6 = 71% | 6.0 = 37% | 5.7 = 35% |
| Rubber discharge [kg/h]$^{2)}$ | 1.7 = 3% | 0.9 = 2% | 0.8 = 2% |

2nd squeeze section

| | | | |
|---|---|---|---|
| Water discharge [kg/h]$^{1)}$ | 0.2 = <1% | 6.1 = 37% | 5.5 = 34% |
| Rubber discharge [kg/h]$^{2)}$ | <0.1 = <1% | 0.7 = 1% | 0.8 = 2% |
| Devolatilization sections Steam discharge [kg/h]$^{1)}$ | 6.2 = 28% | 4.1 = 25% | 4.7 = 29% |
| Extrudate moisture content [% by weight] | 0.2 | <0.1 | 0.1 |

$^{1)}$Percentages based on line * = 100
$^{2)}$Percentages based on line ** = 100
$^{3)}$SE Side extruder, GM Granule metering

| Example | III-7 | III-8 | III-9 |
|---|---|---|---|

Elastomer component A

| | | | |
|---|---|---|---|
| Type | A-3 | A-3 | A-3 |
| Water content [% by weight]* | 29 | 29 | 29 |
| Feed [kg/h]** | 61.3 | 42.0 | 41.0 |
| in Section No. | 1 | 1 | 1 |

Thermoplastic polymer B

| | | | |
|---|---|---|---|
| Type | B-6 | B-6 | B-6 |
| Feed [kg/h] | 38 | 70 | 46 |
| in Section No. | 6 | 6 | 6 |

Further polymer C

| | | | |
|---|---|---|---|
| Type | C-7 | — | C-1 |
| Feed [kg/h] | 20 | — | 12 |
| in Section No. | 10 | — | 10 |
| Feed by$^{3)}$ | SE | — | SE |

Additives D

| | | | | |
|---|---|---|---|---|
| Type | D-8 | D-3 | D-8 | D-7 |
| Feed [kg/h] | 0.5 | 3.0 | 0.7 | 3.0 |
| in Section No. | 11 | 10 | 11 | 10 |
| Feed by$^{3)}$ | MP | SE | MP | SE |

Extruder (main extruder):

| | | | |
|---|---|---|---|
| Speed [rpm] | 300 | 300 | 300 |
| Temperature in Sections 6–12 [° C.] | 250 | 250 | 250 |

1st squeeze section

| | | | |
|---|---|---|---|
| Water discharge [kg/h]$^{1)}$ | 5.4 = 30% | 3.5 = 29% | 5.0 = 42% |
| Rubber discharge [kg/h]$^{2)}$ | 1.0 = 2% | 0.7 = 2% | 0.3 = 1% |

2nd squeeze section

| | | | |
|---|---|---|---|
| Water discharge [kg/h]$^{1)}$ | 3.3 = 19% | 1.7 = 14% | 0.1 = 1% |
| Rubber discharge [kg/h]$^{2)}$ | 0.5 = 1% | 0.2 = 1% | <0.1 = 1% |
| Devolatilization sections Steam discharge [kg/h]$^{1)}$ | 9.0 = 51% | 6.8 = 56% | 6.8 = 57% |
| Extrudate moisture content [% by weight] | 0.2 | 0.2 | <0.1 |

| Example | III-10 |
|---|---|

Elastomer component A

| | |
|---|---|
| Type | A-3 |
| Water content [% by weight]* | 30 |
| Feed [kg/h]** | 40.0 |
| in Section No. | 1 |

Thermoplastic polymer B

| | |
|---|---|
| Type | B-6 |
| Feed [kg/h] | 38 |
| in Section No. | 6 |

Further polymer C

| | |
|---|---|
| Type | C-5 |
| Feed [kg/h] | 20 |
| in Section No. | 10 |
| Feed by$^{3)}$ | SE |

Additives D

| | | |
|---|---|---|
| Type | D-3 | D-8 |
| Feed [kg/h] | 2.7 | 0.6 |
| in Section No. | 10 | 11 |
| Feed by$^{3)}$ | SE | MP |

Extruder (main extruder):

| | |
|---|---|
| Speed [rpm] | 300 |
| Temperature in Sections 6–12 [° C.] | 250 |

1st squeeze section

| | |
|---|---|
| Water discharge [kg/h]$^{1)}$ | 3.4 = 28% |
| Rubber discharge [kg/h]$^{2)}$ | 0.2 = 1% |

2nd squeeze section

| | |
|---|---|
| Water discharge [kg/h]$^{1)}$ | 1.5 = 13% |
| Rubber discharge [kg/h]$^{2)}$ | <0.1 = <1% |
| Devolatilization sections Steam discharge [kg/h]$^{1)}$ | 7.1 = 59% |
| Extrudate moisture content [% by weight] | <0.1 |

$^{1)}$Percentages based on line * = 100
$^{2)}$Percentages based on line ** = 100
$^{3)}$SE Side extruder, MP Metering pump

TABLE 4

Extruder configuration IV

| Example | IV-1 | IV-2 | IV-3 |
|---|---|---|---|

Elastomer component A

| | | | |
|---|---|---|---|
| Type | A-3 | A-3 | A-3 |
| Water content [% by weight]* | 30 | 30 | 30 |
| Feed [kg/h]** | 45.2 | 45.2 | 45.2 |
| in Section No. | 1 | 1 | 1 |

Thermoplastic polymer B

| | | | |
|---|---|---|---|
| Type | B-6 | B-6 | B-6 |
| Feed [kg/h] | 35.2 | 17.6 | 32.5 |
| in Section No. | 5 | 5 | 5 |

Further polymer C

| | | | |
|---|---|---|---|
| Type | — | C-5 | C-5 |
| Feed [kg/h] | — | 17.6 | 32.5 |
| in Section No. | — | 9 | 9 |
| Feed by$^{3)}$ | — | SE | SE |

Additives D

| | | | |
|---|---|---|---|
| Type | — | — | — |
| Feed [kg/h] | | | |
| in Section No. | | | |
| Feed by$^{3)}$ | | | |

Extruder (main extruder):

| | | | |
|---|---|---|---|
| Speed [rpm] | 300 | 300 | 300 |
| Temperature in Sections 5–12 [° C.] | 240 | 240 | 240 |

1st squeeze section

| | | | |
|---|---|---|---|
| Water discharge [kg/h]$^{1)}$ | 4.9 = 36% | 5.3 = 39% | 6.8 = 50% |
| Rubber discharge [kg/h]$^{2)}$ | 0.3 = 1% | 0.2 = <1% | 0.2 = <1% |

TABLE 4-continued

Extruder configuration IV

2nd squeeze section

| | | | |
|---|---|---|---|
| Water discharge [kg/h][1] | 0 | 0 | 0 |
| Rubber discharge [kg/h][2] | 0 | 0 | 0 |
| Devolatilization sections Steam discharge [kg/h][1] | 8.6 = 63% | 8.2 = 61% | 6.7 = 49% |
| Extrudate moisture content [% by weight] | <0.1 | <0.1 | <0.1 |

| Example | IV-4 | IV-5 | IV-6 |
|---|---|---|---|
| Elastomer component A | | | |
| Type | A-3 | A-3 | A-3 |
| Water content [% by weight]* | 30 | 30 | 30 |
| Feed [kg/h]** | 45.2 | 45.2 | 37.6 |
| in Section No. | 1 | 1 | 1 |
| Thermoplastic polymer B | | | |
| Type | B-6 | B-5 | B-5 |
| Feed [kg/h] | 45 | 40 | 15 |
| in Section No. | 5 | 5 | 5 |
| Further polymer C | | | |
| Type | C-5 | C-3 | C-3 |
| Feed [kg/h] | 45 | 30 | 60 |
| in Section No. | 9 | 9 | 9 |
| Feed by[3] | SE | SE | SE |
| Additives D | | | |
| Type | — | — | — |
| Feed [kg/h] | | | |
| in Section No. | | | |
| Feed by[3] | | | |
| Extruder (main extruder): | | | |
| Speed [rpm] | 300 | 300 | 300 |
| Temperature in Sections 5–12 [° C.] | 240 | 240 | 240 |
| 1st squeeze section | | | |
| Water discharge [kg/h][1] | 5.6 = 36% | 6.1 = 45% | 4.7 = 42% |
| Rubber discharge [kg/h][2] | 0.2 = 1% | 0.3 = 1% | 0.2 = 1% |
| 2nd squeeze section | | | |
| Water discharge [kg/h][1] | 0 | 0 | 0 |
| Rubber discharge [kg/h][2] | 0 | 0 | 0 |
| Devolatilization sections Steam discharge [kg/h][1] | 9.7 = 63% | 7.4 = 55% | 6.6 = 59% |
| Extrudate moisture content [% by weight] | <0.1 | <0.1 | <0.1 |

[1] Percentages based on line * = 100
[2] Percentages based on line ** = 100
[3] SE Side extruder

TABLE 5

Extruder configuration V

| Example | V-1 | V-2 |
|---|---|---|
| Elastomer component A | | |
| Type | A-3 | A-3 |
| Water content [% by weight]* | 34.9 | 30.0 |
| Feed [kg/h]** | 159.1 | 157.1 |
| in Section No. | 1 | 1 |
| Thermoplastic polymer B | | |
| Type | B-5 | B-5 |
| Feed [kg/h] | 124.2 | 124.2 |
| in Section No. | 5 | 5 |

TABLE 5-continued

Extruder configuration V

| Example | V-1 | V-2 |
|---|---|---|
| Further polymer C | | |
| Type | — | — |
| Feed [kg/h] | | |
| in Section No. | | |
| Feed by | | |
| Additives D | | |
| Type | — | — |
| Feed [kg/h] | | |
| in Section No. | | |
| Feed by | | |
| Extruder (main extruder): | | |
| Speed [rpm] | 285 | 285 |
| Temperature in Sections 5–10 [° C.] | 250 | 250 |
| 1st squeeze section | | |
| Water discharge [kg/h][1] | 25.0 = 45% | 9.9 = 21% |
| Rubber discharge [kg/h][2] | 7.9 = 5% | 2.5 = 2% |
| 2nd squeeze section | | |
| Water discharge [kg/h][1] | 7.9 = 14% | 5.4 = 11% |
| Rubber discharge [kg/h][2] | 2.4 = 2% | 0.1 = <1% |
| Devolatilization sections Steam discharge [kg/h][1] | 22.6 = 41% | 31.8 = 67% |
| Extrudate moisture content [% by weight] | <0.1 | <0.1 |

[1] Percentages based on line * = 100
[2] Percentages based on line ** = 100

TABLE 6

Extruder configuration VI

| Example | VI-1 | VI-2 | VI-3 |
|---|---|---|---|
| Elastomer component A | | | |
| Type | A-3 | A-3 | A-3 |
| Water content [Gew.-%]* | 30 | 25 | 25 |
| Feed [kg/h]** | 42.1 | 42.1 | 42.1 |
| in Section No. | 1 | 1 | 1 |
| Thermoplastic polymer B | | | |
| Type | B-6 | B-6 | B-6 |
| Feed [kg/h] | 90 | 38.2 | 32.9 |
| in Section No. | 5 | 5 | 5 |
| Further polymer C | | | |
| Type | — | C-5 | C-5 |
| Feed [kg/h] | — | 72 | 53.5 |
| in Section No. | | 9 | 9 |
| Feed by[3] | | SE | SE |
| Additives D | | | |
| Type | — | — | — |
| Feed [kg/h] | | | |
| in Section No. | | | |
| Feed by[3] | | | |
| Extruder (main extruder): | | | |
| Speed [rpm] | 300 | 300 | 300 |
| Temperature in Sections 6–12 [° C.] | 240 | 240 | 240 |
| 1st squeeze section | | | |
| Water discharge [kg/h][1] | 4.2 = 33% | 3.7 = 35% | 3.6 = 34% |
| Rubber discharge [kg/h][2] | 0.1 = <1% | 0.1 = <1% | 0.1 = <1% |

TABLE 6-continued

Extruder configuration VI

| Example | VI-1 | VI-2 | VI-3 |
|---|---|---|---|
| 2nd squeeze section | | | |
| Water discharge [kg/h][1] | 0 | 0 | 0 |
| Rubber discharge [kg/h][2] | 0 | 0 | 0 |
| Devolatilization sections Steam discharge [kg/h][1] | 8.4 = 67% | 6.8 = 64% | 6.9 = 65% |
| Extrudate moisture content [% by weight] | 0.1 | <0.1 | <0.1 |

| Example | VI-4 | VI-5 | VI-6 |
|---|---|---|---|
| Elastomer component A | | | |
| Type | A-3 | A-3 | A-3 |
| Water content [Gew.-%]* | 25 | 25 | 25 |
| Feed [kg/h]** | 42.1 | 32.3 | 35.1 |
| in Section No. | 1 | 1 | 1 |
| Thermoplastic polymer B | | | |
| Type | B-6 | B-9 | B-6 |
| Feed [kg/h] | 38.2 | 30.8 | 30.8 |
| in Section No. | 5 | 5 | 5 |
| Further polymer C | | | |
| Type | C-5 | C-8 | C-8 |
| Feed [kg/h] | 31.8 | 46.2 | 46.2 |
| in Section No. | 9 | 9 | 9 |
| Feed by[3] | SE | SE | SE |
| Additives D | | | |
| Type | — | — | — |
| Feed [kg/h] | | | |
| in Section No. | | | |
| Feed by[3] | | | |
| Extruder (main extruder): | | | |
| Speed [rpm] | 300 | 300 | 300 |
| Temperature in Sections 6–12 [° C.] | 240 | 240 | 240 |
| 1st squeeze section | | | |
| Water discharge [kg/h][1] | 3.5 = 33% | 4.4 = 54% | 3.2 = 36% |
| Rubber discharge [kg/h][2] | 0.1 = <1% | 0.5 = 2% | 0.3 = 1% |
| 2nd squeeze section | | | |
| Water discharge [kg/h][1] | 0 | 0 | 0 |
| Rubber discharge [kg/h][2] | 0 | 0 | 0 |
| Devolatilization sections Steam discharge [kg/h][1] | 7.0 = 67% | 3.7 = 46% | 5.6 = 64% |
| Extrudate moisture content [% by weight] | <0.1 | 0.1 | <0.1 |

| Example | VI-7 | VI-8 | VI-9 |
|---|---|---|---|
| Elastomer component A | | | |
| Type | A-3 | A-3 | A-3 |
| Water content [Gew.-%]* | 25 | 25 | 25 |
| Feed [kg/h]** | 42.1 | 42.1 | 42.1 |
| in Section No. | 1 | 1 | 1 |
| Thermoplastic polymer B | | | |
| Type | B-9 | B-9 | B-6 |
| Feed [kg/h] | 50 | 30.8 | 30.8 |
| in Section No. | 5 | 5 | 5 |
| Further polymer C | | | |
| Type | C-9 | C-8 | C-8 |
| Feed [kg/h] | 50 | 46.2 | 46.2 |
| in Section No. | 9 | 9 | 9 |
| Feed by[3] | SE | SE | SE |
| Additives D | | | |
| Type | — | — | — |
| Feed [kg/h] | | | |
| in Section No. | | | |
| Feed by[3] | | | |
| Extruder (main extruder): | | | |
| Speed [rpm] | 300 | 300 | 300 |
| Temperature in Sections 6–12 [° C.] | 240 | 240 | 240 |
| 1st squeeze section | | | |
| Water discharge [kg/h][1] | 5.3 = 50% | 5.9 = 56% | 4.2 = 40% |
| Rubber discharge [kg/h][2] | 1.6 = 4% | 1.7 = 4% | 1.1 = 3% |
| 2nd squeeze section | | | |
| Water discharge [kg/h][1] | 0 | 0 | 0 |
| Rubber discharge [kg/h][2] | 0 | 0 | 0 |
| Devolatilization sections Steam discharge [kg/h][1] | 5.2 = 49% | 4.6 = 43% | 6.3 = 60% |
| Extrudate moisture content [% by weight] | 0.2 | 0.2 | 0.2 |

[1])Percentages based on line * = 100
[2])Percentages based on line ** = 100
[3])SE Side extruder

TABLE 7

Extruder configuration VII

| Example | VII-1 | VII-2 | VII-3 |
|---|---|---|---|
| Elastomer component A | | | |
| Type | A-3 | A-3 | A-3 |
| Water content [Gew.-%]* | 30 | 30 | 30 |
| Feed [kg/h]** | 34.6 | 34.6 | 34.6 |
| in Section No. | 1 | 1 | 1 |
| Thermoplastic polymer B | | | |
| Type | B-6 | B-6 | B-6 |
| Feed [kg/h] | 76.3 | 76.3 | 76.3 |
| in Section No. | 4 | 4 | 4 |
| Further polymer C | | | |
| Type | — | — | — |
| Feed [kg/h] | | | |
| in Section No. | | | |
| Feed by | | | |
| Additives D | | | |
| Type | — | — | — |
| Feed [kg/h] | | | |
| in Section No. | | | |
| Feed by | | | |
| Extruder (main extruder): | | | |
| Speed [rpm] | 260 | 240 | 220 |
| Temperature in Sections 4–12 [° C.] | 240 | 240 | 240 |
| 1st squeeze section | | | |
| Water discharge [kg/h][1] | 4.9 = 47% | 4.9 = 47% | 5.1 = 49% |
| Rubber discharge [kg/h][2] | 0.6 = 2% | 0.5 = 1% | 0.6 = 2% |
| 2nd squeeze section | | | |
| Water discharge [kg/h][1] | 0 | 0 | 0 |
| Rubber discharge [kg/h][2] | 0 | 0 | 0 |
| Devolatilization sections Steam discharge [kg/h][1] | 5.5 = 52% | 5.5 = 52% | 5.2 = 51% |
| Extrudate moisture content [% by weight] | 0.1 | 0.1 | 0.1 |

| Example | VII-4 | VII-5 | VII-6 |
|---|---|---|---|
| Elastomer component A | | | |
| Type | A-3 | A-3 | A-3 |
| Water content [Gew.-%]* | 30 | 30 | 30 |

TABLE 7-continued

| Extruder configuration VII | | | |
|---|---|---|---|
| Feed [kg/h]** | 34.6 | 34.6 | 34.6 |
| in Section No. | 1 | 1 | 1 |
| Thermoplastic polymer B | | | |
| Type | B-6 | B-6 | B-6 |
| Feed [kg/h] | 71.3 | 76.3 | 71.3 |
| in Section No. | 4 | 4 | 4 |
| Further polymer C | | | |
| Type | C-6 | — | C-6 |
| Feed [kg/h] | 5 | | 5 |
| in Section No. | 1 | | 1 |
| Feed by[3] | GD | | GD |
| Additives D | | | |
| Type | — | — | — |
| Feed [kg/h] | | | |
| in Section No. | | | |
| Feed by[3] | | | |
| Extruder (main extruder): | | | |
| Speed [rpm] | 220 | 300 | 300 |
| Temperature in Sections 4–12 [° C.] | 240 | 240 | 240 |
| Squeeze section | | | |
| Water discharge [kg/h][1] | 4.1 = 39% | 4.2 = 40% | 5.0 = 48% |
| Rubber discharge [kg/h][2] | 0.5 = 1% | 0.5 = 1% | 0.6 = 2% |
| Devolatilization sections Steam discharge [kg/h][1] | 6.3 = 61% | 6.2 = 60% | 5.3 = 51% |
| Extrudate moisture content [% by weight] | 0.1 | 0.1% | 0.1% |

| Example | VII-7 |
|---|---|
| Elastomer component A | |
| Type | A-3 |
| Water content [Gew.-%]* | 30 |
| Feed [kg/h]** | 34.6 |
| in Section No. | 1 |
| Thermoplastic polymer B | |
| Type | B-6 |
| Feed [kg/h] | 76.3 |
| in Section No. | 4 |
| Further polymer C | |
| Type | — |
| Feed [kg/h] | |
| in Section No. | |
| Feed by | |
| Additives D | |
| Type | — |
| Feed [kg/h] | |
| in Section No. | |
| Feed by | |
| Extruder (main extruder): | |
| Speed [rpm] | 280 |
| Temperature in Sections 4–12 [° C.] | 240 |
| Squeeze section | |
| Water discharge [kg/h][1] | 3.7 = 36% |
| Rubber discharge [kg/h][2] | 0.4 = 1% |
| Devolatilization sections Steam discharge [kg/h][1] | 6.6 = 63% |
| Extrudate moisture content [% by weight] | <0.1 |

[1] Percentages based on line * = 100
[2] Percentages based on line ** = 100
[3] GD Addition of granules The 46 Examples demonstrate the versatility of the novel process. Five different elastomer components A, eight different thermoplastic polymers B, seven different further polymers C and eight different additives D were used in a very wide range of combinations, with the result that toughened thermoplastics or polymer blends of very different types were prepared.

In the Examples, from 26 (Example II-2) to 74% by weight (Example III-5, the sum of both squeeze sections) of the residual water initially contained in the partially dewatered rubber were removed as liquid water in the squeeze sections. The arithmetic mean over all 46 Examples of the residual water removed in the squeeze sections was 46% by weight. The remainder to 100% by weight was removed as steam in the devolatilization sections (apart from the small extrudate moisture content). The differences between the percentages for the sum of discharge of squeezed-out water plus steam discharge and 100% by weight are due predominantly to rounding inaccuracies.

The rubber discharge is small, being on average about 2% by weight and not more than about 5% by weight of the amount of moist rubber (Example V-1).

The Examples demonstrate the flexibility of the process even with regard to the throughput. The flow rates of the individual components could be varied within a wide range:

elastomer component A: from 25.0 kg/h (Ex. II-6) to 159.1 kg/h (Ex. V-1), thermoplastic polymer B: from 10 kg (Ex. III-4) to 124.2 kg/h (Ex. V-1 and V-2), further polymer C: from 5 kg/h (Ex. VII-4 and VII-6) to 60 kg/h (Ex. IV-6), additives D: from 0.5 kg/h (Ex. III-7) to 8 kg/h (Ex. II-4).

In particular, it was possible to prepare both products having a low elastomer content and products having a high elastomer content.

The individual components could be fed to the extruder in different sections: in the Examples, component B was introduced into Section 4 (Ex. VII), into Section 5 (Ex. I, II, IV, V and VI) or into Section 6 (Ex. III);

component C was introduced into Section 1 (Ex. III-4, VII-4 and VII-6), into Section 9 (Ex. II-4, II-6 to II-9, IV-2 to IV-6, VI-2 to VI-9 or into Section 10 (Ex. III-1, III-5 to III-7, III-9 and III-10);

component D was introduced into Section 1 (Ex. I-2, I-3, II-7 and III-3), into Section 9 (Ex. II-1 to II-4, II-8 and II-9), into Section 10 (Ex. II-5, III-6 and III-9), into Section 11 (Ex. III-7) or into Sections 10 and 11 (Ex. III-2, III-8 and III-10).

The location of the feed was accordingly also variable.

Extruders with different screw diameters (40 mm and 58 mm) were used for the process. The rate of rotation of the screw was likewise varied, and was set at from 300 to 220 rpm in the examples: 300 rpm, 285 rpm (EX. V), from 220 to 300 rpm (Ex. VII).

It was also possible without difficulty to operate the extruder with a "dry" second squeeze section (no water discharge) (Ex. IV, VI and VII).

It was possible to operate the extruder in a trouble-free manner in each of its seven configurations over a long time, trouble-free extruder running times of several hundred hours with varying products being achieved.

We claim:

1. A process for the preparation of toughened thermoplastics or polymer blends containing toughened thermoplastics, the thermoplastics or the polymer blends comprising A) from 5 to 95% by weight of at least one water-moist elastomer component A containing up to 60% by weight of residual water, B) from 5 to 95% by weight of at least one thermoplastic polymer B, C) from 0 to 95% by weight of at least one further polymer C, and D) from 0 to 70% by weight of additives D, by mixing the elastomer component A with the thermoplastic polymer B and, if present, the further polymer C and, if present, the additives D in an extruder with mechanical dewatering of the elastomer component A, wherein the components A, B, C and D are fed to an extruder which has at least two screws rotating in the same direction or in opposite directions and having a screw diameter $D_{Screw}$, and, in the conveying direction, the extruder being essentially composed of at least one metering section into which elastomer component A is fed to the extruder by a metering device, at least one squeeze section which serves for dewatering the elastomer component A and contains at least a first retarding element and at least one dewatering orifice which is present upstream of the first retarding element by a distance corresponding to at least one screw diameter $D_{Screw}$, at least one feed section in which the thermoplastic polymer B is introduced as a melt into the extruder, at least one plastication section provided with mixing or kneading elements, at least a last devolatilization section which is provided with at least one devolatilization orifice and in which the remaining water is removed as steam, and a discharge zone, wherein some or all of the water emerging from the dewatering orifices is present in the liquid phase, wherein the components C and/or D are fed to the extruder together or separately from one another, either together with the components A and/or B or separately from A and B and wherein the screws of the extruder have a flight depth ratio $D_{Screw,\ external}/D_{Screw,\ internal}$ of from 1.2 to 1.8.

2. A process as claimed in claim 1, wherein the extruder is a twin-screw extruder having screws rotating in the same direction.

3. A process as claimed in claim 1, wherein the extruder has, between the last devolatilization section and the discharge zone, a further section in which the components C and/or D are fed to the extruder together or separately from one another by at least one metering device, and wherein this further section is provided with mixing and/or kneading elements.

4. A process as claimed in claim 3, wherein the metering device for the component C and/or D is an extruder.

5. A process as claimed in claim 1, wherein the discharge zone is terminated by a die head and a melt filtration apparatus present, when viewed in the conveying direction, before the die head.

6. A process as claimed in claim 5, wherein an apparatus for melt granulation is present behind the die head.

7. A process as claimed in claim 6, wherein the apparatus for melt granulation is operated under water.

8. A process as claimed in claim 1, wherein no Seiher housings are used as dewatering orifices in the squeeze sections.

9. A process as claimed in claim 1, wherein the extruder is not heated in the metering sections for the elastomer component A, and wherein the extruder is not heated in the squeeze sections.

10. A process as claimed in claim 1, wherein the extruder has, downstream in the region behind the feed section for the melt of the thermoplastic polymer B and before the end of the extruder, at least one further feed section for the melt of the thermoplastic polymer B.

11. A process as claimed in claim 10, wherein the further feed section for the melt of the thermoplastic polymer B is located between the last devolatilization section and the discharge zone, or in the discharge zone.

12. A process as claimed in claim 1, wherein, in the devolatilization sections, the devolatilization orifices are arranged laterally on the extruder.

13. A process as claimed in claim 1, wherein the components C and/or D are fed to the extruder in a vent section located in the direction opposite the conveying direction of the extruder from the metering section.

14. A process as claimed in claim 1, wherein the components C and/or D are fed to the extruder also in the section in which the thermoplastic polymer B is introduced into the extruder.

15. A process as claimed in claim 1, wherein the components C and/or D are fed to the extruder also in the metering section.

16. A process as claimed in claim 1, wherein the screws of the twin-screw extruder are two-flighted.

17. A process as claimed in claim 1, wherein the components C and/or D are fed to the extruder in the devolatilization section or in a further section which is located directly before the discharge zone.

18. A process as claimed in claim 1, wherein the extruder is operated at a screw speed of from 50 to 1200 rpm and mean shear rates, based on half the flight depth of the screw, of from 15 to 450 $s^{-1}$.

19. A process as claimed in claim 1, wherein at least one graft rubber having a residual water content of up to 60% by weight is used as elastomer component A.

20. A process as claimed in claim 1, wherein a two-stage or multistage graft rubber containing a base stage comprising one or more of the monomers butadiene, styrene, alkylstyrene, alkyl acrylate, alkyl methacrylate and optionally small amounts of crosslinking monomers, and a graft stage comprising styrene, alkylstyrene, acrylonitrile, methyl methacrylate or a mixture of these monomers is used as elastomer component A, and a styrene/acrylonitrile copolymer, an α-methylstyrene/acrylonitrile copolymer, polystyrene, polymethyl methacrylate, polyvinyl chloride or a mixture of these polymers is used as the thermoplastic polymer B.

21. A process as claimed in claim 1, wherein a graft rubber based on polybutadiene or polyalkyl acrylate as the base stage and a copolymer of styrene and acrylonitrile as the graft stage is used as elastomer component A, and a styrene/acrylonitrile copolymer is used as the thermoplastic polymer B.

22. A process as claimed in claim 1, wherein a two-stage or multistage graft rubber which essentially comprises polyalkyl acrylate and a copolymer of styrene and acrylonitrile is used as elastomer component A, and a styrene/acrylonitrile copolymer is used as thermoplastic polymer B.

23. A process as claimed in claim 1, wherein the component C is identical to the component B but fed to the extruder at another point than the component B, or a thermoplastic polymer based on the monomers used for the preparation of the thermoplastic polymer B, having the same overall composition but with a different average molecular weight $M_w$ or with other amounts of the monomers, or a polymer obtained by copolymerization of $C_2-C_8$-alkenes with vinylaromatics, with polar comonomers, with carbon monoxide, with nonaromatic vinyl compounds or with basic monomers, or a polymer based on α-methylstyrene/acrylonitrile or methyl methacrylate/alkyl acrylate, or a polymer based on a rubber comprising butadiene and, optionally, comonomers, or a polymer prepared by anionic polymerization of butadiene and styrene, in which optionally some or all of the olefinic double bonds have been hydrogenated, or a polymer based on a thermoplastic polyurethane, or a polymer based on polycarbonate, or a polymer based on styrene, acrylonitrile, methyl methacrylate, maleic anhydride and maleimides, or a mixture of at least two of these polymers.

24. A process as claimed in claim 19, wherein the graft rubber is particulate and has graft rubber particles with a diameter of from 0.05 to 20 μm.

25. A process as claimed in claim 24, wherein the graft rubber particles have a particle size distribution having one maximum (monomodal), two maxima (bimodal) or more than two maxima.

26. An extruder which has at least two screws rotating in the same direction or in opposite directions and having a screw diameter $D_{Screw}$, composed of the sections as claimed in claim 1.

27. A process as claimed in claim 1, wherein an apparatus for melt granulation is present behind the discharge zone.

28. A process as claimed in claim 27, wherein the apparatus for melt granulation is operated under water.

\* \* \* \* \*